United States Patent
Zohoorian et al.

(10) Patent No.: US 12,170,935 B2
(45) Date of Patent: Dec. 17, 2024

(54) DETERMINING ORIENTATION OF DEPLOYED ACCESS POINTS

(71) Applicant: Juniper Networks, Inc., Sunnyvale, CA (US)

(72) Inventors: Mohammad Zohoorian, San Francisco, CA (US); Jie C Jiang, San Jose, CA (US); Nagarjun Srinivasan, Sunnyvale, CA (US); Robert J. Friday, Los Gatos, CA (US); Kevin Friday, Los Gatos, CA (US); Shmuel Shaffer, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 256 days.

(21) Appl. No.: 17/651,526

(22) Filed: Feb. 17, 2022

(65) Prior Publication Data
US 2023/0171561 A1    Jun. 1, 2023

Related U.S. Application Data

(60) Provisional application No. 63/284,517, filed on Nov. 30, 2021.

(51) Int. Cl.
*H04W 4/029* (2018.01)
*H04W 4/02* (2018.01)

(52) U.S. Cl.
CPC .......... *H04W 4/029* (2018.02); *H04W 4/026* (2013.01)

(58) Field of Classification Search
CPC ... H04W 16/28; H04W 64/003; H04W 88/08; H04W 4/026; H04W 4/029; H04W 88/02;
(Continued)

(56) References Cited

U.S. PATENT DOCUMENTS

| 9,729,439 B2 | 8/2017 | MeLampy et al. |
| 9,729,682 B2 | 8/2017 | Kumar et al. |

(Continued)

FOREIGN PATENT DOCUMENTS

| CN | 107484241 B | 9/2019 |
| EP | 3859371 A1 | 8/2021 |

(Continued)

OTHER PUBLICATIONS

U.S. Appl. No. 17/303,222, filed May 24, 2021, naming inventor Safavi.

(Continued)

*Primary Examiner* — Kwasi Karikari
(74) *Attorney, Agent, or Firm* — Shumaker & Sieffert, P.A.

(57) ABSTRACT

A system includes a plurality of access point devices (APs) configured to provide a wireless network at a site, each of the plurality of APs having a known location, and a network management system comprising one or more processors and a memory comprising instructions that when executed by the one or more processors cause the one or more processors to: determine, based on a known location of a first AP of the plurality of APs, a known location of a second AP of the plurality of APs, and received signal strength measurements of wireless signals originating at one or more antennas of the first AP and received by one or more antennas of the second AP, an orientation angle of the second AP; and generate an output indicative of the orientation angle of the second AP.

24 Claims, 18 Drawing Sheets

(58) Field of Classification Search
CPC ..... H04W 84/12; H04W 24/02; H04W 4/023; H04W 4/025
See application file for complete search history.

(56) References Cited

U.S. PATENT DOCUMENTS

| | | |
|---|---|---|
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |
| 10,862,742 B2 | 12/2020 | Singh |
| 10,958,537 B2 | 3/2021 | Safavi |
| 10,958,585 B2 | 3/2021 | Safavi |
| 10,985,969 B2 | 4/2021 | Safavi |
| 10,992,543 B1 | 4/2021 | Rachamadugu et al. |
| 2014/0266908 A1* | 9/2014 | Pandey ............... G01S 5/0247 342/417 |
| 2019/0265367 A1 | 8/2019 | Silverman et al. |
| 2020/0403890 A1 | 12/2020 | McCulley et al. |
| 2021/0282024 A1* | 9/2021 | Moreman ............. H04W 16/18 |
| 2021/0306201 A1 | 9/2021 | Wang et al. |

FOREIGN PATENT DOCUMENTS

| | | |
|---|---|---|
| WO | 2016023190 A1 | 2/2016 |
| WO | 2016176667 A1 | 11/2016 |

OTHER PUBLICATIONS

U.S. Appl. No. 17/453,7525, filed Nov. 5, 2021, naming inventor Zohoorian.
U.S. Appl. No. 63/125,595, filed Dec. 15, 2020, naming inventor Zohoorian.
U.S. Appl. No. 63/243,616, filed Sep. 13, 2021, naming inventor Zohoorian.
Extended Search Report from counterpart European Application No. 22172342.2 dated Oct. 27, 2022, 8 pp.
Response to Extended Search Report dated Oct. 7, 2022, from counterpart European Application No. 22172342.2 filed Nov. 28, 2023, 31 pp.

* cited by examiner

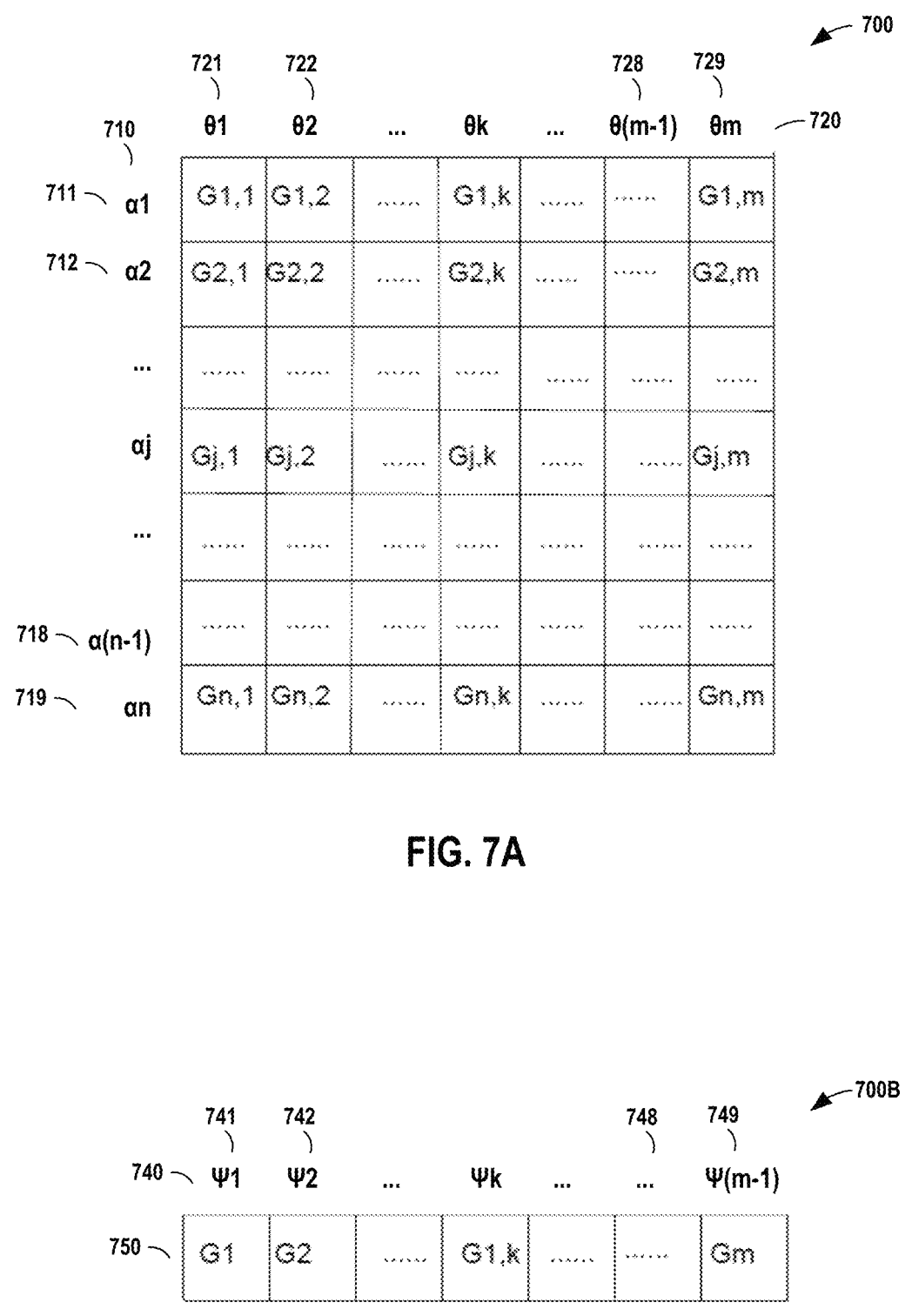

|  | $\theta_1$ | $\theta_2$ | ... | $\theta_k$ | ... | $\theta_{(m-1)}$ | $\theta_m$ |
|---|---|---|---|---|---|---|---|
| $\alpha_1$ | $G_{1,1}$ | $G_{1,2}$ | ...... | $G_{1,k}$ | ...... | ------ | $G_{1,m}$ |
| $\alpha_2$ | $G_{2,1}$ | $G_{2,2}$ | ...... | $G_{2,k}$ | ...... | ------ | $G_{2,m}$ |
| ... | ...... | ...... | ...... | ...... | ...... | ...... | ...... |
| $\alpha_j$ | $G_{j,1}$ | $G_{j,2}$ | ...... | $G_{j,k}$ | ...... | ...... | $G_{j,m}$ |
| ... | ...... | ...... | ...... | ...... | ...... | ...... | ...... |
| $\alpha_{(n-1)}$ | ...... | ...... | ...... | ...... | ...... | ...... | ...... |
| $\alpha_n$ | $G_{n,1}$ | $G_{n,2}$ | ...... | $G_{n,k}$ | ...... | ...... | $G_{n,m}$ |

FIG. 7A

| $\Psi_1$ | $\Psi_2$ | ... | $\Psi_k$ | ... | ... | $\Psi_{(m-1)}$ |
|---|---|---|---|---|---|---|
| $G_1$ | $G_2$ | ...... | $G_{1,k}$ | ...... | ------ | $G_m$ |

DETERMINING ORIENTATION OF DEPLOYED ACCESS POINTS

This application claims the benefit of U.S. Provisional Patent Application No. 63/284,517, filed Nov. 30, 2021, and entitled "Determining Orientation of Deployed Access Points," which is incorporated by reference herein in its entirety.

FIELD

The disclosure relates generally to computer networks and, more specifically, to monitoring and control of wireless networks.

BACKGROUND

Traditionally the orientation of access points (APs) in a wireless network is precisely manually aligned with respect to a set of coordinates during deployment. Alternatively, the orientation may be manually measured as part of provisioning the network after the deployment of a Wi-Fi network is completed. Knowing the orientation of a deployed AP is useful in a variety of applications. For example, location determination algorithms assume either precise alignment of AP orientation, or alternatively in other implementations, knowledge of the relative orientation between the APs to ensure accurate location determination for client devices such as mobile devices, terminals, and user equipment (UE) associated with a wireless network.

SUMMARY

In accordance with one or more techniques of the disclosure, a network management system (NMS) automatically determines orientations of one or more APs in a wireless network based on received signal strength measurements of wireless signals from the one or more of APs. For example, the NMS determines, based on a known location of a first AP of the plurality of APs, a known location of a second AP of the plurality of APs, and received signal strength measurements of wireless signals originating at one or more antennas of the first AP and received by one or more antennas of the second AP, an orientation angle of the second AP.

In one example, the disclosure is directed to a system comprising: a plurality of access point devices (APs) configured to provide a wireless network at a site, each of the plurality of APs having a known location; and a network management system comprising: one or more processors; and a memory comprising instructions that when executed by the one or more processors cause the one or more processors to: determine, based on a known location of a first AP of the plurality of APs, a known location of a second AP of the plurality of APs, and received signal strength measurements of wireless signals transmitted between one or more antennas of the first AP and one or more antennas of the second AP, an orientation angle of the second AP; and generate an output indicative of the orientation angle of the second AP.

In another example, the disclosure is directed to a method comprising: determining, based on a known location of a first AP of a plurality of access point devices (APs) configured to provide a wireless network at a site, a known location of a second AP of the plurality of APs, and received signal strength measurements of wireless signals transmitted between one or more antennas of the first AP and one or more antennas of the second AP, an orientation angle of the second AP; and generating an output indicative of the orientation angle of the second AP.

In another example, the disclosure is directed to a non-transitory computer readable medium comprising instructions that when executed by one or more processors cause the one or more processors to: determine, based on a known location of a first AP of a plurality of access point devices (APs) configured to provide a wireless network at a site, a known location of a second AP of the plurality of APs, and received signal strength measurements of wireless signals transmitted between one or more antennas of the first AP and one or more antennas of the second AP, an orientation angle of the second AP; and generate an output indicative of the orientation angle of the second AP.

BRIEF DESCRIPTION OF DRAWINGS

FIGS. 7A-7B illustrate example antenna gain tables.

FIG. 9 illustrates a table representing the strength of a signal received by an $i^{th}$ antenna of a first AP and originated at a $j^{th}$ antenna of a second AP.

DETAILED DESCRIPTION

Figure 1A:
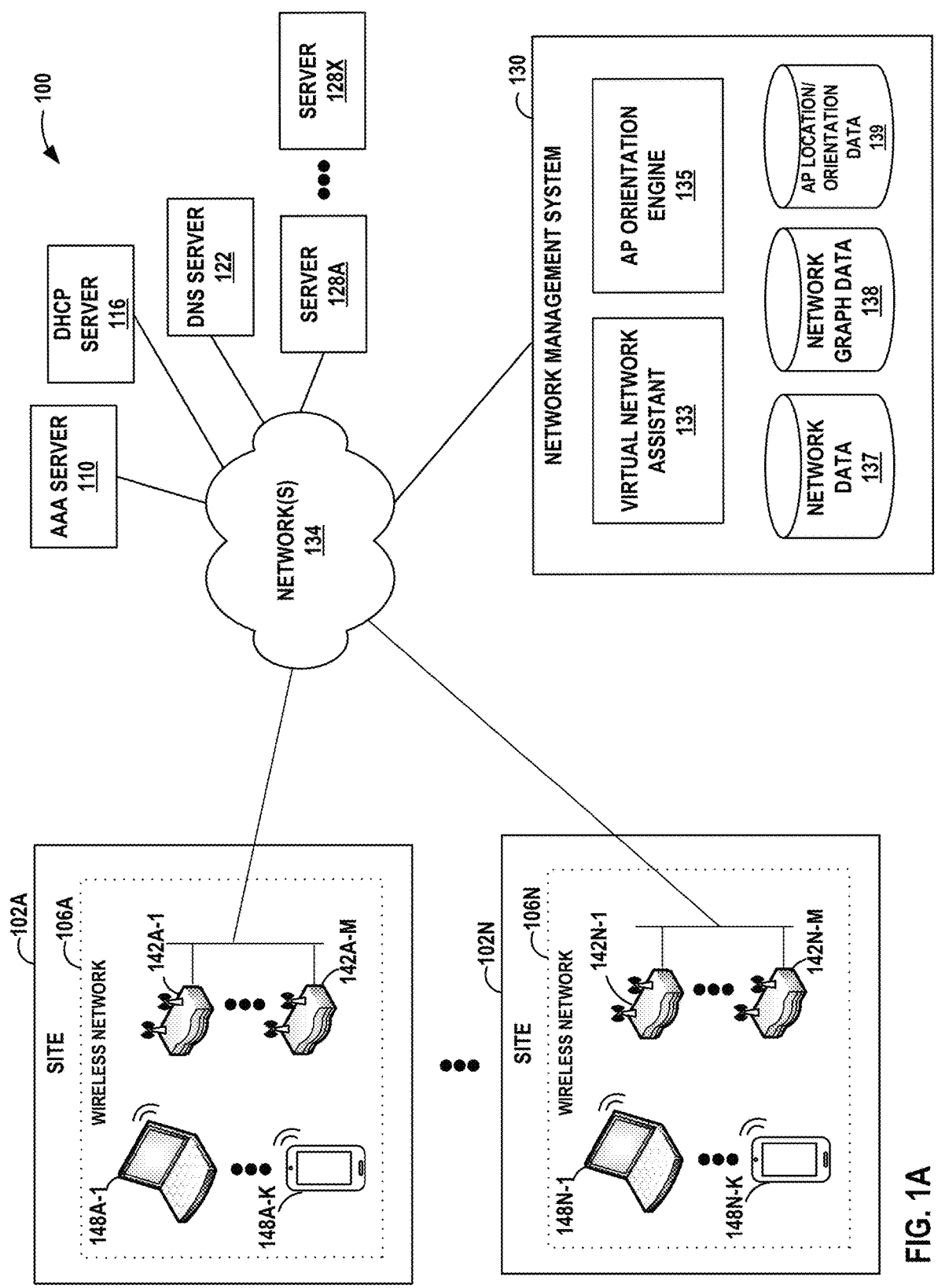
FIG. 1A is a diagram of an example network system that determines orientations of deployed access points (APs), in accordance with one or more techniques of the disclosure.

Existing solutions of AP orientation typically employ a location determination algorithm to estimate distances between antennas of different APs or the location of each AP antenna. The orientation of the AP is then determined based on a best fit of the estimated antenna locations and a template of the relative locations of the antennas of the specific AP. Due to the limited accuracy of the distances between the antennas relative to the small distances between the antennas of the AP, it is a challenge to obtain a precise AP orientation due to the large geometric dilution of the solution.

In accordance with one or more techniques of the disclosure, a network management system (NMS) automatically determines orientations of one or more APs in a wireless network based on received signal strength measurements of wireless signals from the one or more of APs. For example, the NMS determines, based on a known location of a first AP of the plurality of APs, a known location of a second AP of the plurality of APs, and received signal strength measurements of wireless signals originating at one or more antennas of the first AP and received by one or more antennas of the second AP, an orientation angle of the second AP.

The techniques of the disclosure may provide one or more technical advantages, technical improvements, and practical applications. As an example, the techniques described herein enable automated determination of the orientation of a plurality of deployed APs to provide highly accurate determination of AP orientations quickly and efficiently. For example, the disclosed examples recognize that in order to provide more accurate orientation determinations, the orientation of an AP should be determined without going through intermediary steps, such as estimating distances between a reference AP and an AP whose orientation is being estimated, which may introduce additional error into the calculation of the AP orientations. Instead, the techniques of the disclosure automatically determine the orientation of each AP directly from the measured signal strengths (e.g., RSSI) of wireless signals. The received signal strength indicator (RSSI) can be measured for wireless signals which, for example, may include 2.4 Ghz and/or 5 GHz band(s), thus avoiding the inaccuracies introduced by the geometric dilution of precision.

In addition, the ability to automatically determine the orientation of APs may greatly reduce the cost to deploy a wireless network because it is not necessary to dispatch technicians to conduct an on-site survey. It may also increase the accuracy of the determined AP orientations as compared to the error-prone and time consuming process of manually measuring and logging of hundreds or even thousands of AP orientations. The techniques therefore support the provision of highly accurate location-based services at a site, which depend upon the location and orientation of each of AP being known to a high degree of accuracy. Yet another benefit is that it facilitates automated and remote verification of AP deployment orientations without necessitating dispatching technicians to conduct an on-site survey. In addition, the determined AP orientations provided by the techniques described herein may further be used for RF coverage optimization and radio resource management of the APs at the site, such as channel and transmit power level selection.

For example, some examples derive values of a plurality of unknown state variables, in the continuous domain, via a plurality of equations that each represents a signal strength measurement from a corresponding plurality of signal strength measurements. By solving multiple equations having multiple unknowns, the disclosed examples are able to derive the orientation of an AP with respect to a reference AP with a greater precision. These parameters include, in various examples, one or more of a path loss exponent (PLE) parameter, an intercept (Int) parameter, a receiver antenna gain (Gr) parameter, and a transmit antenna gain (Gt).

In some examples, the techniques solve for these parameters using a grid search. In other examples, the techniques compute first derivatives of the generated equations, and evaluate the derivatives across a number of possible values for the unknown parameters or states. Some examples implement a gradient ascent technique to identify parameter values that maximize a probability that a wireless device (e.g., an AP) is positioned in a particular orientation.

Some examples derive, along with an orientation of a wireless device, an intercept parameter and/or a path loss exponent parameter. Some examples recognize that the intercept parameter includes multiple components, such as a transmit power component, receiver antenna gain parameter, or a transmit antenna gain parameter. Both the receiver antenna gain parameter and the transmit antenna gain parameter are functions of the wireless device orientation, at least in some examples. In some examples, a transmit power component is known or otherwise estimable, for example, via heuristics or via a communication exchange with one or more access points. Some examples thus derive only components of the intercept parameter and not the intercept parameter as a whole. By reducing the scope of the unknown states being derived by the disclosed examples, an orientation error is reduced.

FIG. 1A is a diagram of an example network system 100 in which a network management system determines orientations of one or more APs in a wireless network(s), in accordance with one or more techniques of the disclosure. Example network system 100, such as a network system for an organization or enterprise, includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. Although the example of FIG. 1A is described with respect to wireless network systems, the techniques described in this disclosure may apply to wired network systems and/or wireless network systems.

Each site 102A-102N also includes a plurality of wireless client devices, otherwise known as user equipment devices (UEs), referred to generally as client devices 148 or UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring, or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to wireless client devices, IoT devices and end users at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as Wi-Fi clients, APs, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. NMS 130 may include a network performance engine that automatically determines one or more service level experience (SLE) metrics for each client device 148 associated with a wireless network 106. SLE metrics determined based on the collected network data can be used to measure various aspects of wireless network performance. SLE metrics seek to measure and understand network performance from the viewpoint of the end user experience on the network.

One example SLE metric is a coverage metric, which tracks the number of user minutes that a client device's received signal strength indicator (RSSI) as measured by the client and conveyed via an access point with which the UE is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance, and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways, and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In some examples, an NMS agent (not shown) runs on UEs 148 and/or APs 142 and provides telemetry data to NMS 130 from the perspective of UEs 148 and/or AP 142. The NMS agent allows NMS 130 to receive telemetry data related to the client device experience from the client devices' perspectives, in addition to data already received by NMS 130 from the perspective of an AP through which the client device connects to NMS 130. The NMS agent may also provide device properties of the UE 148 and/or APs 142 to NMS 130, including operating system (OS) version, modem firmware and software versions, application version running the network agent, and the like.

Figure 1B:
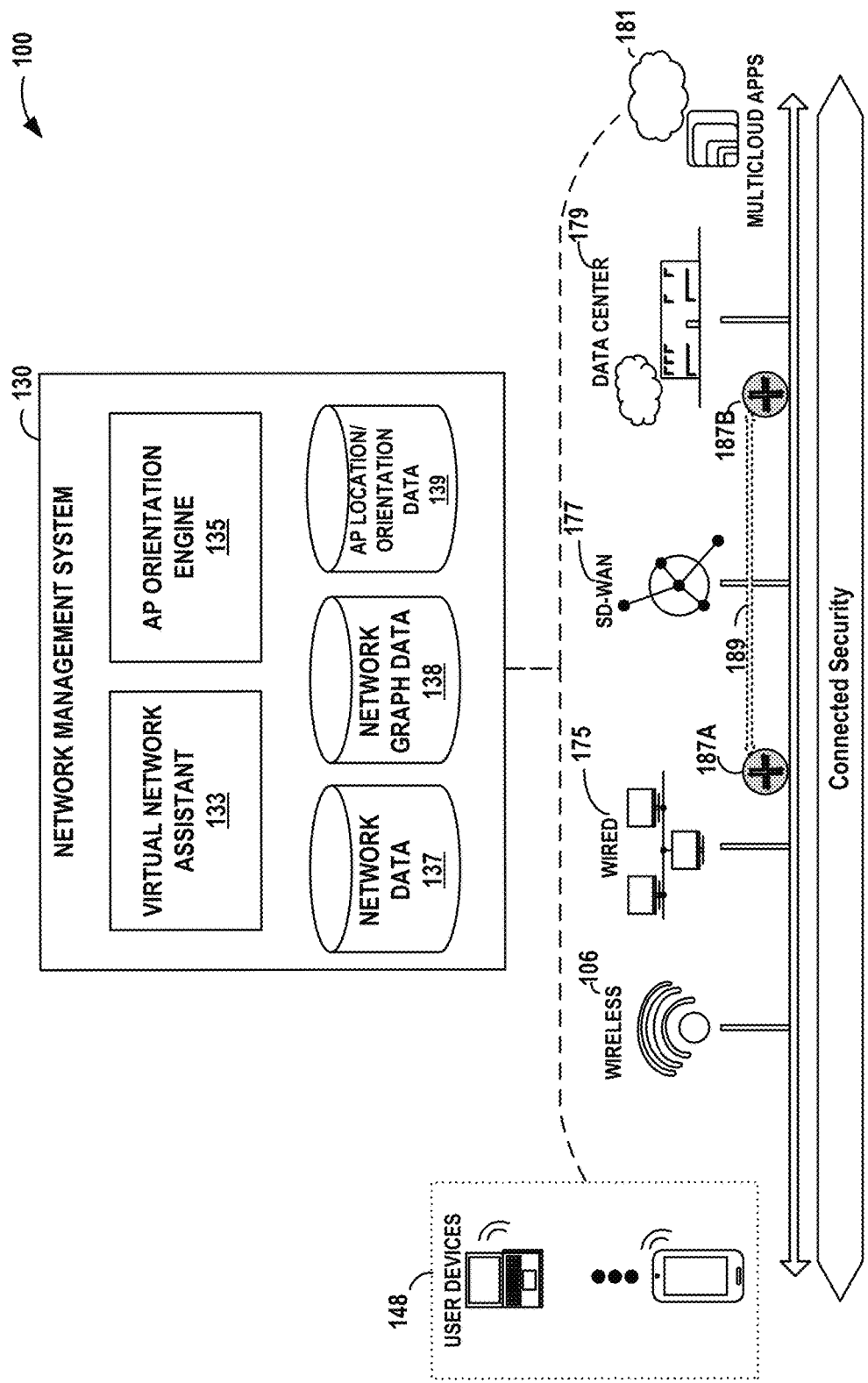
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless networks 106 and wired LAN 175 networks at the network edge (far left of FIG. 1B) to cloud-based application services 181 hosted by computing resources within data centers 179 (far right of FIG. 1). In some examples, NMS 130 includes or is communication with a location engine that automatically determines the locations of the one or more APs, and these known locations are utilized in the process of determining the orientations of the one or more APs.

As described herein, NMS 130 provides an integrated suite of management tools and implements various techniques of this disclosure. In general, NMS 130 may provide a cloud-based platform for wireless network data acquisition, determining location and orientation of one or more deployed APs in a wireless network, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with one or more techniques of the disclosure, NMS 130 as shown in FIG. 1A and/or FIG. 1B automatically determines orientations of one or more APs in a wireless network based on received signal strength measurements of wireless signals from the one or more of APs. In some examples, NMS 130 determines, based on a known location of a first AP of the plurality of APs, a known location of a second AP of the plurality of APs, and received signal strength measurements of wireless signals originating at one or more antennas of the first AP and received by one or more antennas of the second AP, an orientation angle of the second AP.

Figure 2:
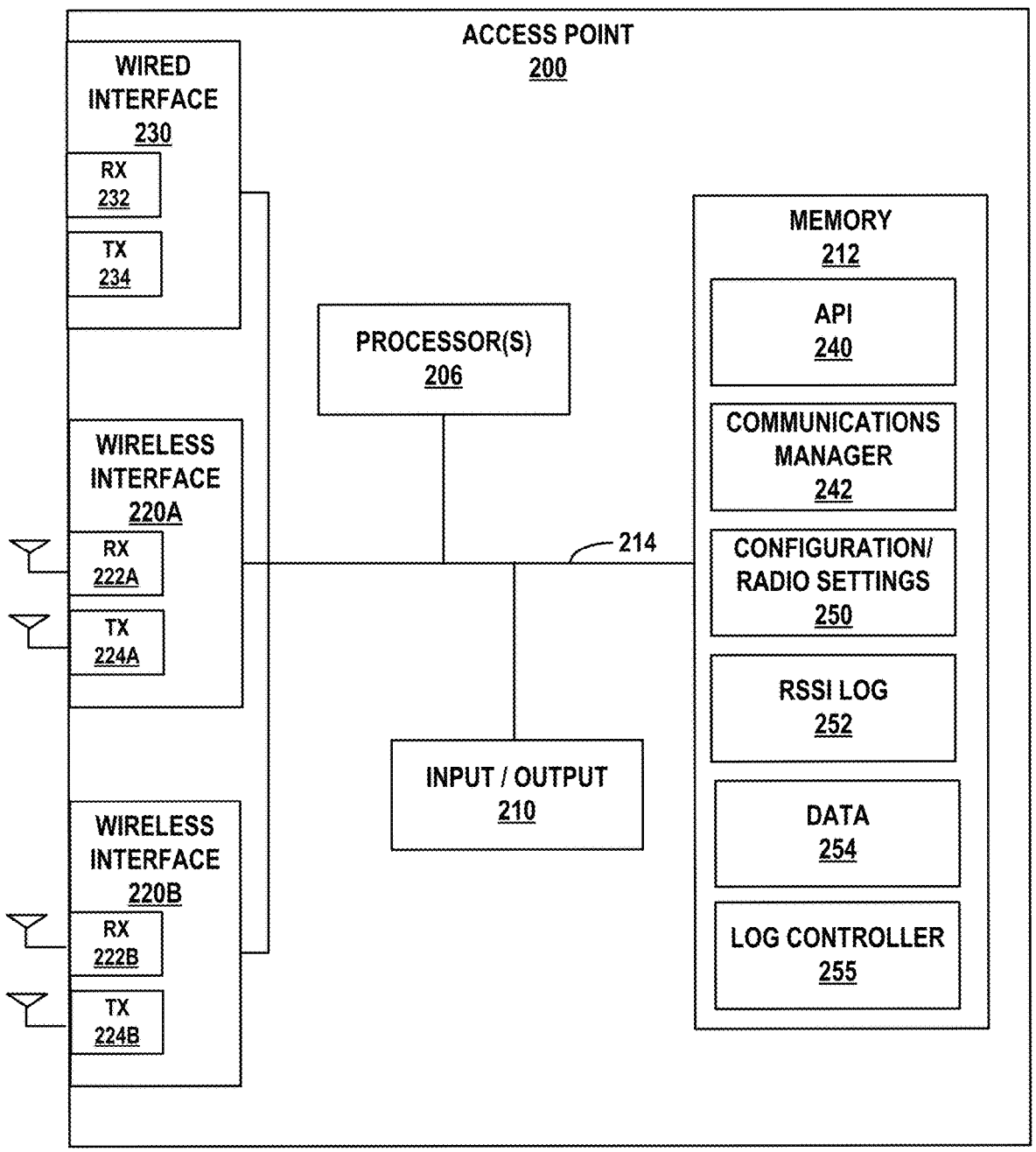
FIG. 2 is a block diagram of an example AP, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as APs 142 and/or UEs 148 of FIG. 1A. First and second wireless interfaces 220A and 220B further include transmitters 224A and 224B, respectively, each including transmit antennas via which access point 200 may transmit wireless signals to wireless communications devices, such as APs 142 and/or UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. RSSI log 252 includes network data, e.g., a list of RSSI values of signals received by this AP that originated from neighboring APs.

Network data stored in data 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from APs 142 and/or UEs 148, such as successful events, failure events, and/or neutral events, that is transmitted by access point device 200 to NMS 130 for cloud-based management of wireless networks 106A by NMS 130.

Communications manager 242 includes program code that, when executed by processor(s) 206, allow access point 200 to communicate with other APs 142 and/or UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display, and the like. Although not shown, memory 212 typically stores executable software for controlling a user interface with respect to input received via I/O 210.

Figure 3A:
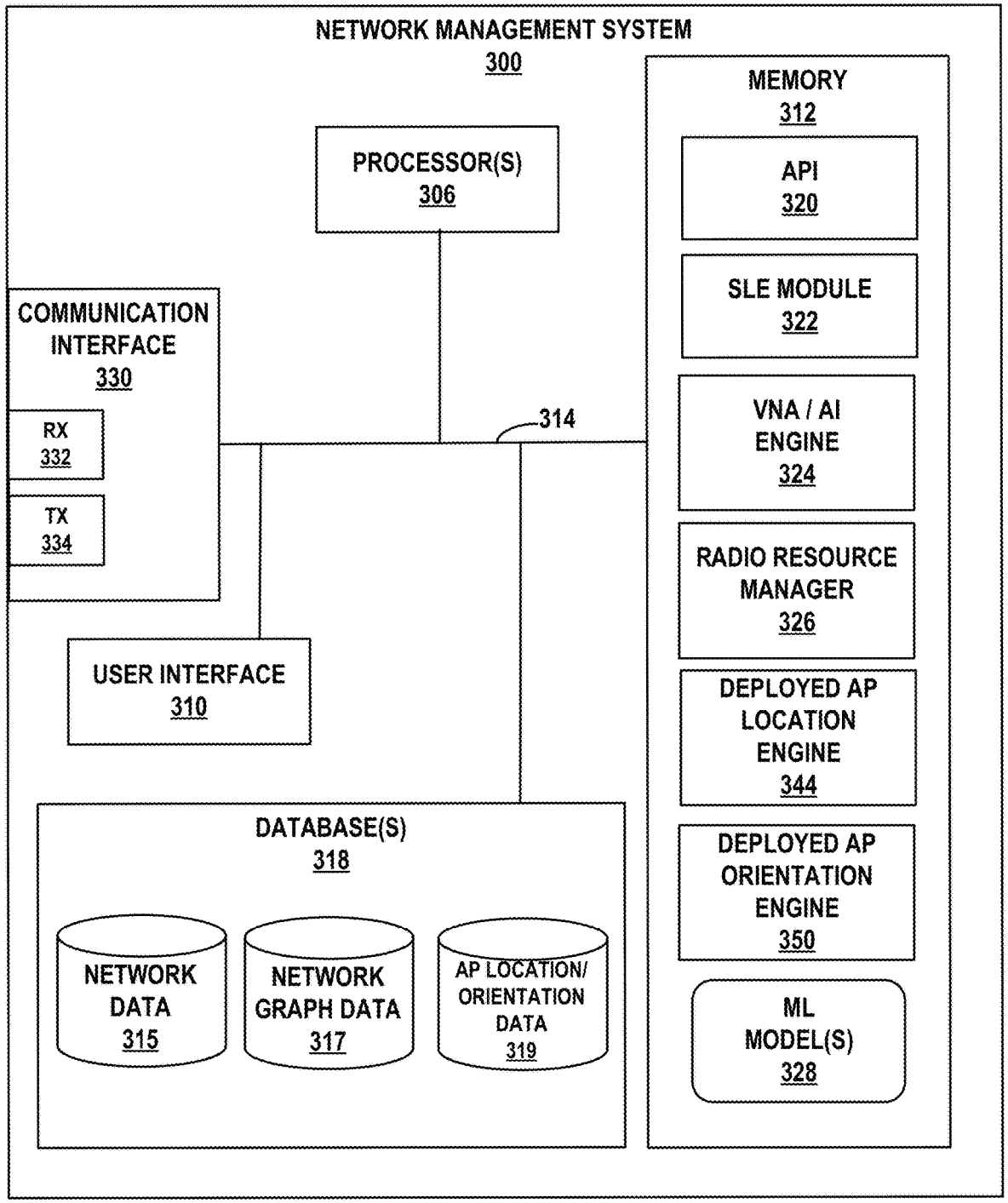
FIG. 3A is a block diagram of an example network management system configured to determine orientations of deployed APs, in accordance with one or more techniques of the disclosure.

FIG. 3A is a block diagram of an example network management system (NMS) 300 determines orientation of one or more APs in a wireless network, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively. In some examples, NMS 300 receives network data collected or monitored by AP devices 142 and/or by UEs 148, and analyzes this data for cloud-based management of wireless networks 106A-106N. In some examples, NMS 300 may be part of another server shown in FIG. 1A or a part of any other server.

In accordance with one or more techniques of the disclosure, NMS 300 automatically determines orientations of one or more APs in a wireless network based on received signal strength measurements of wireless signals from the one or more of the APs. In some examples, NMS 130 determines, based on a known location of a first AP of the plurality of APs, a known location of a second AP of the plurality of APs, and received signal strength measurements of wireless signals originating at one or more antennas of the first AP and received by one or more antennas of the second AP, an orientation angle of the second AP.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIG. 1A or 1B. The data and information received by NMS 300 may include, for example, network data and/or RSSI data received from APs 142 and used by NMS 300 to remotely monitor and/or control the performance of wireless networks 106A-106N, as well as to determine the orientations of one or more APs 142. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 326, a virtual network assistant (VNA)/AI engine 324, and one or more machine learning models 328. In some examples, NMS 300 includes a deployed AP location engine 344 that automatically determines the location (e.g., x, y, and or z coordinates) of one or more deployed APs in a wireless network. In accordance with one or more techniques of the disclosure, NMS 300 includes a deployed AP orientation engine 350 that automatically determines the orientation (e.g., angle of orientation with respect to a reference axis) of one or more APs 142 in a wireless network based on received signal strength measurements of wireless signals transmitted by the one or more APs. In some examples, the deployed AP location engine 344 and/or the deployed AP orientation engine 350 may be executed remotely from NMS 300, or may be executed by any one of servers 110, 116, 122, 128A-128N, or at a server/computing device located at any of sites 102, and the disclosure is not limited in this respect.

NMS 300 may also include any other programmed modules, software engines and/or interfaces configured for remote monitoring and management of wireless networks 106A-106N, including remote monitoring and management of any of AP devices 142.

RRM engine 326 monitors one or more metrics for each site 106A-106N in order to learn and optimize the radio-frequency (RF) environment at each site. For example, RRM engine 326 may monitor the coverage and capacity SLE metrics (e.g., managed by SLE module 322) for a wireless network 106 at a site 102 in order to identify potential issues with coverage and/or capacity in the wireless network 106 and to adjust the radio settings of the access points at each site to address the identified issues. RRM engine 326 may determine channel and transmit power distribution across AP devices 142 in each network 106A-106N. RRM engine 326 may monitor events, power, channel, bandwidth, and number of clients connected to each AP device. RRM engine 326 may measure the strength of a radio signal of client devices, such as an RSSI value. RRM engine 326 may further automatically change or update configurations of one or more AP devices 142 at a site 106 with an aim to improve the coverage and/or capacity SLE metrics and thus to provide an improved wireless experience for the user. In some examples, RRM engine 326 may use received signal strength indicator (RSSI) information received from one or more UEs 148 in order to learn and optimize the RF environment provided by one or more APs 142 in the wireless network.

VNA/AI engine 324 analyzes network data received from AP devices 142, one or more UEs 148, as well as its own data to monitor performance of wireless networks 106A-106N. For example, VNA engine 324 may identify when anomalous or abnormal states are encountered in one of wireless networks 106A-106N. VNA/AI engine 324 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 324 may automatically invoke one or more remedial actions intended to address the identified root cause(s) of one or more poor SLE metrics. Examples of remedial actions that may be automatically invoked by VNA/AI engine 350 may include, but are not limited to, invoking RRM 326 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 324 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected Wi-Fi clients). This data, in addition to any network data collected by one or more APs 142A-1 through 142A-N in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level(s) for each particular SLE metric meets the configured threshold value(s). In some examples, each SLE metric may further include one or more classifiers. If a metric(s) do not meet the configured SLE threshold value for the site, the failure may be attributed to one of the classifiers to further understand how and/or why the failure occurred.

Figure 3B:
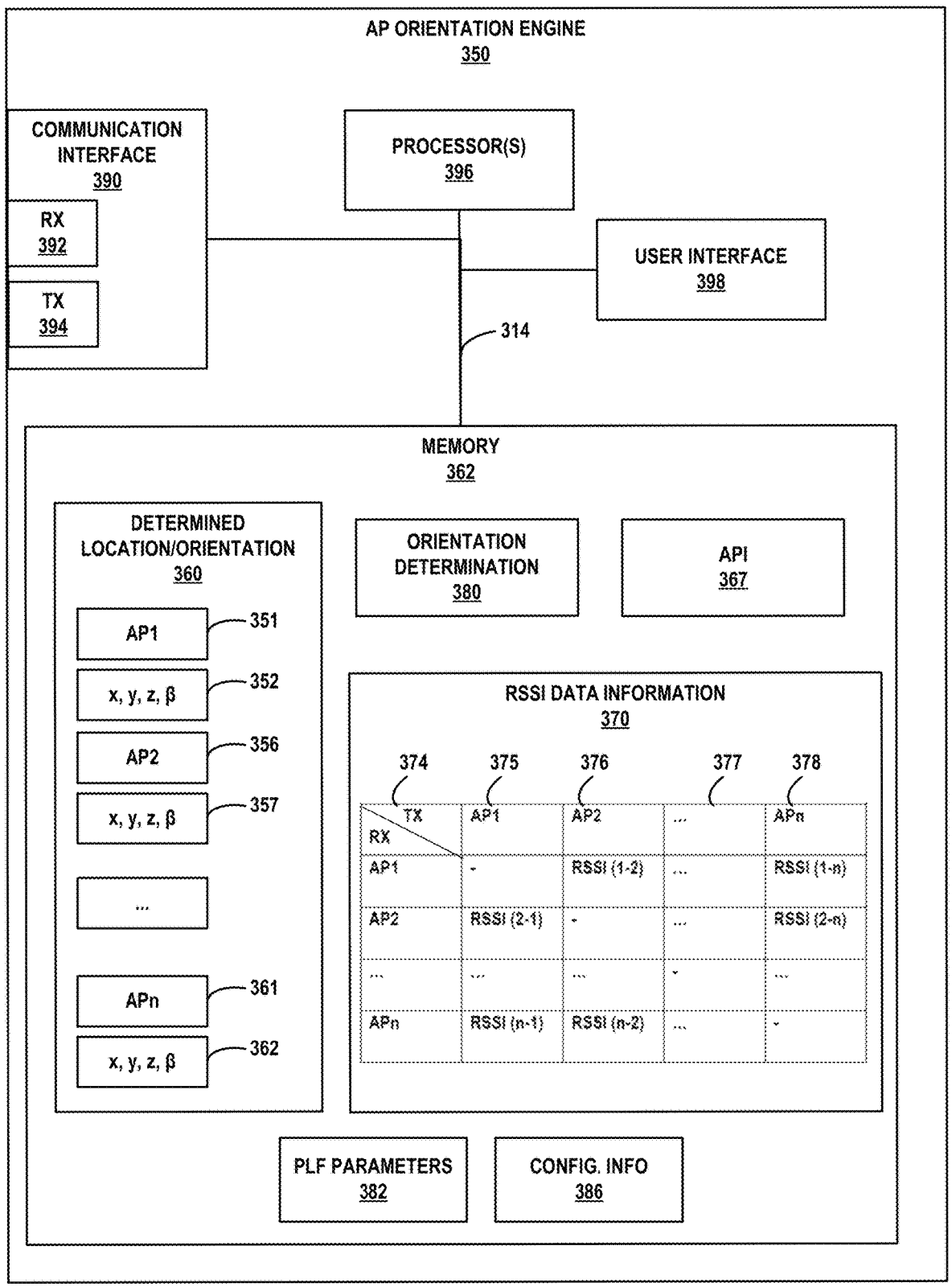
FIG. 3B is a block diagram of an example AP orientation engine, in accordance with one or more techniques of the disclosure.

FIG. 3B is a more detailed block diagram of an example AP orientation engine 350 in accordance with one or more techniques of the disclosure. In general, each AP 142 includes a receiver that receives wireless signals from one or more other APs 142 in a wireless network. The receiving AP uses the power of the received wireless signals to determine the RSSI associated with the wireless signals received by the AP and originating from (e.g., transmitted by) one or more other APs in the wireless network. These RSSI measurements are transmitted from the APs to NMS 130/300 and stored in, for example, RSSI log 252. When executed by one or more processors of NMS 300, AP orientation engine 350 uses these RSSI signal values to automatically determine the orientation of one or more APs associated with the wireless network.

In the example of FIG. 3B, AP orientation engine 350 includes a communications interface 390, e.g., an Ethernet interface, a hardware processor(s) 396, a user interface 398 (e.g., display, printer, keyboard, keypad, touch screen, mouse, stylus, etc.), and a memory 362 coupled together via a bus 314 over which the various elements interchange data and information. Communications interface 390 couples the AP orientation engine 350 to a network and/or the Internet. Communications interface 390 includes a receiver 392 via which the AP orientation engine 350 receives data and information, e.g., including signal strength information from the various APs, and a transmitter 394, via which the AP orientation engine 350 transmits data and information, e.g., including location information for one or more wireless devices, and confirm receipt of information from other devices of the network.

Memory 362 includes a data structure (in this example, a table 370) that stores received signal strength data information, a data structure 360 that stores determined locations/orientations of one or more deployed APs 142, an AP orientation determination module 380, an API 367, configuration information 386, and path loss function (PLF) parameters 382. AP orientation determination module 380 includes for example, one or more software modules that, when executed by the one or more processors(s) 396, cause processors 396 to determine the orientations of one or more APs based on received signal strength measurements. Received signal strength data information table 370 that includes a list of APs, AP1-APn, associated with a wireless network. Columns 375 through 378 provide a data structure to store the received signal strength measurements for wireless signals received by each AP from every other AP. For example, the table 370 indicates that AP1 receives a wireless signal transmitted from AP2 with a received signal strength of $RSSI_{(1-2)}$. AP1 also receives a wireless signal transmitted from APn with a received signal strength value of $RSSI_{(1-n)}$, etc. If a received signal strength value of a wireless signal is not above a certain threshold, the corresponding cell might be left blank or otherwise indicate that the two APs are not "neighbors." The RSSI values may include a time stamp and/or may be updated periodically or on demand to reflect the current state of the wireless network and/or to provide historical RSSI information concerning the state of the wireless network. Configuration information 386 stores configuration parameters entered by the system administrator or by the programmer. Path loss function (PLF) parameters 382 provide storage for static or dynamic path loss function parameters, such as path loss exponent (PLE) and/or intercept (Int) as described herein above.

It should be noted that for sake of simplicity the table 370 illustrate a simplified implementation wherein each AP has only a single antenna and as such can transmit/receive only a single signal from another AP. In other example implementations, each of the one or more APs may include multiple (e.g., 8) antennas and as such are capable of receiving/transmitting multiple (e.g., 8) signals from/to antennas of the other APs associated with the wireless network.

Memory 362 further includes a determined location/orientation data structure 360 configured to store the orientation of one or more APs as automatically determined by orientation determination module 380. In some examples, location/orientation data structure 360 also stores the location (e.g., as (x, y) or (x, y, z) coordinates) of the one or more APs. For example, FIG. 3B shows an example of data 351 corresponding to AP1 and the corresponding location (e.g., (x, y) or (x, y, z) coordinates) and orientation (e.g., angle β) data 352 corresponding to AP1. FIG. 3B also shows AP2 data 356 and corresponding location (e.g., (x, y) or (x, y, z) coordinates) and orientation (e.g., angle β) data 357, and APn data 361 and corresponding location (e.g., (x, y) or (x, y, z) coordinates) and orientation (e.g., angle β) data 362. Although the AP locations are shown as being stored in the same data structure 360 as the one or more determined UE locations, the AP locations may be stored in a different data structure, and the disclosure is not limited in this respect.

Figure 4:
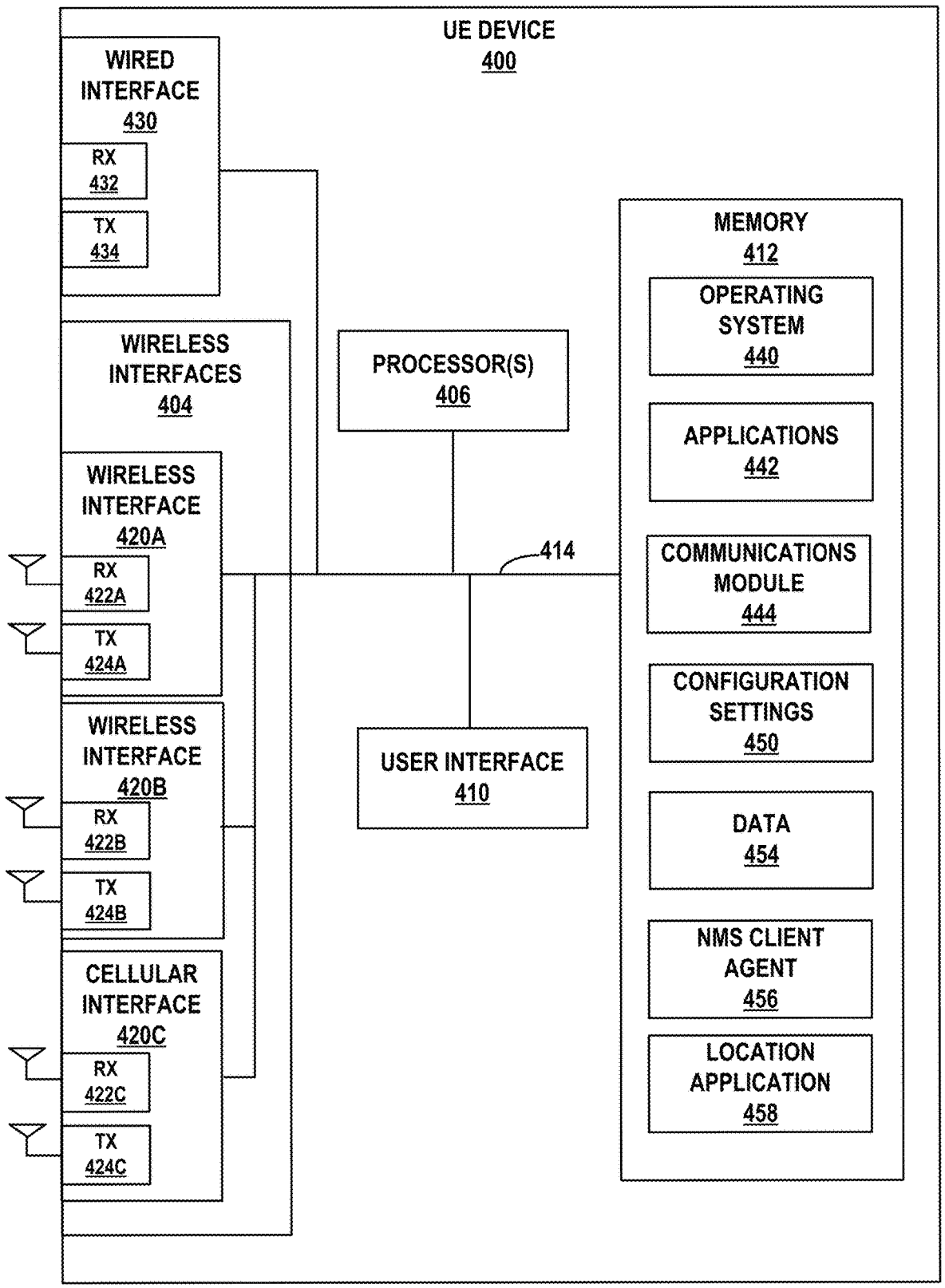
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, NMS 130 receives relevant network data from UEs 148 on a continuous basis (e.g., every 2 seconds or other appropriate time period). The network data 454 may include, for example, RSSI measurements of one or more wireless signals received from one or more AP devices by UE 400 as measured by the AP devices.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used to determine proximity to a proximity zone, that is collected by UE 400 and transmitted to any of AP devices 142 in a wireless network 106 for further transmission to NMS 150.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

In this example, UE device 400 further includes an NMS client agent 456 and a location application 458. NMS client agent 456 sends client-side data including, for example, UE device information to NMS 130 via its connected AP. For example, the UE sends information about not only the AP that the UE is currently associated with, but also information about other APs that UE recognized and did not associate with, and their signal strengths. NMS 300 receives the client-side data from the associated AP, where the client-side data includes the information about other APs the UE 400 recognized besides the AP sending the client-side data to NMS 300. The client-side UE device information may further include, for example, a device type, a device connection type (e.g., cellular or Wi-Fi), corresponding signal strength(s), roaming information, etc. Location application 458 provides location services to UE 400, such as location-based notifications and/or wayfinding, etc. Location-related data provided by location application 458 may also be provided to NMS 300 via, for example, NMS client agent 456, which may then use the location-related data to provide location services to the wireless network customer (e.g., the owner of the site), such as location information for one or more UEs associated with the wireless network, density (location) information of users over time, to provide targeted notifications or services to users based on their location, etc.

Figure 5:
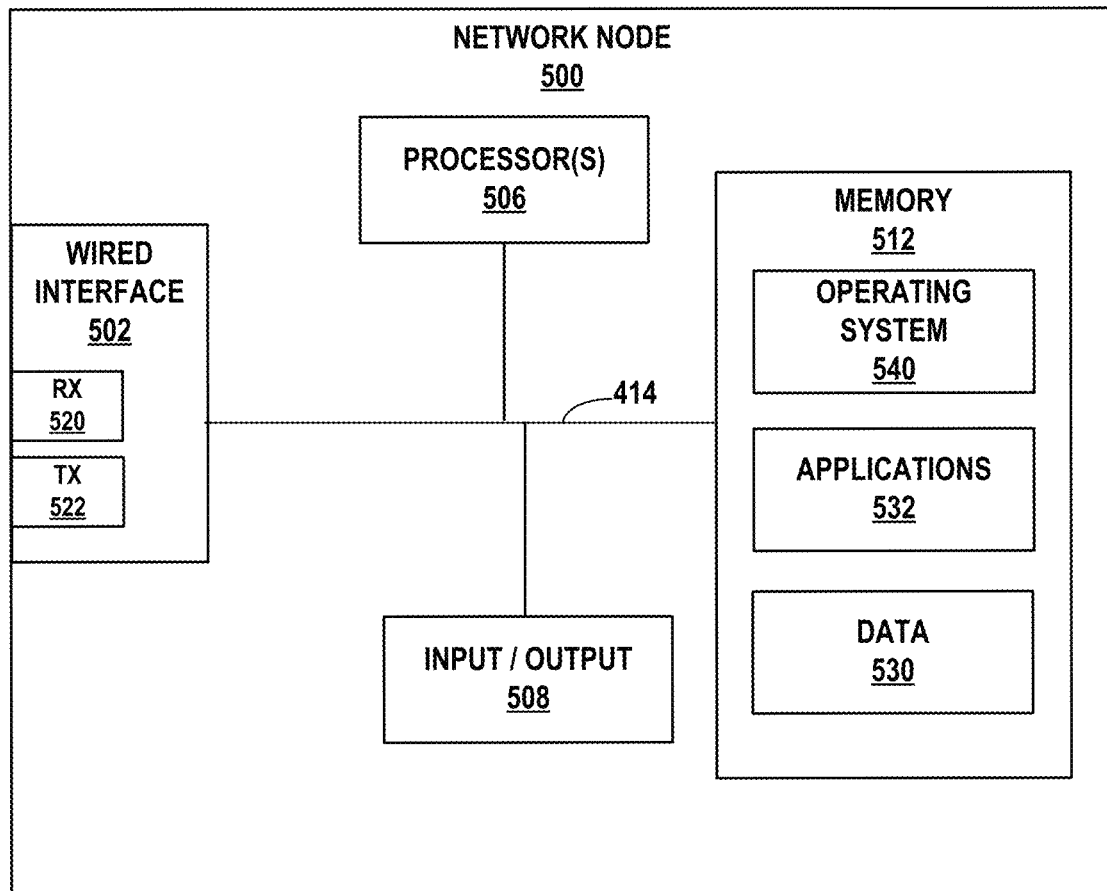
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1, e.g., router, switch, AAA server 110, DHCP server 116, DNS server 122, VNA 133, AP location module 135, Web server 128A-128X, etc., or a network device such as, e.g., routers, switches, or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including data indicative of distances between APs, and/or operation related information such as registration request, AAA services, DHCP requests, Simple Notification Service (SNS) look-ups, and Web page requests). Communications interface 502 includes a transmitter 522, via which the network node 500 can send data and information (e.g., including location information, configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6:
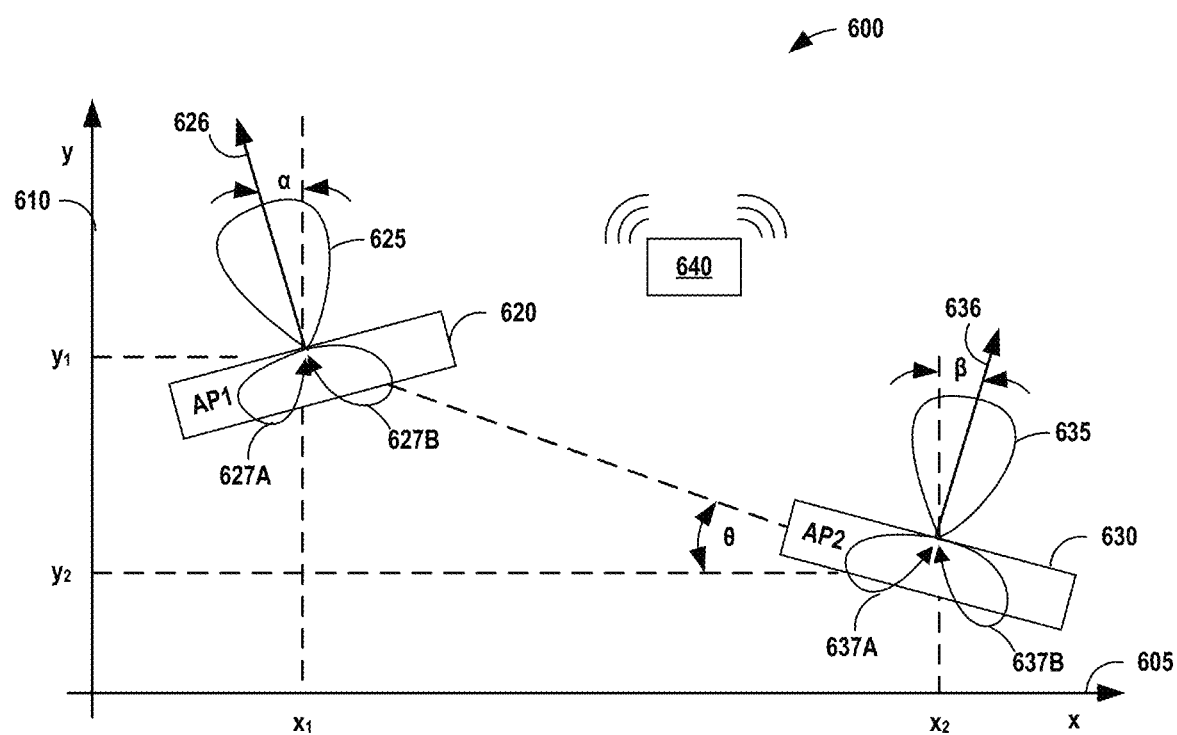
FIG. 6 shows an example network environment in which the orientation of one or more deployed APs may be determined in accordance with one or more techniques of the disclosure.

FIG. 6 shows an example network environment 600. FIG. 6 illustrates two APS within the network environment 600, a first AP 620 (AP1) and a second AP 630 (AP2). An x, y reference coordinate system defined by x-axis 605 and y-axis 610 is associated with network environment 600, and is used to indicate coordinate locations and orientations of APs and wireless devices associated with the network environment (e.g., wireless devices that are in communication with one or more APs at a site). AP 620 broadcasts a wireless signal having a radiation pattern including a main lobe 625 and two side lobes 627A and 627B. AP 630 broadcasts a wireless signal having a radiation pattern including a main lobe 636 and two side lobes 637A and 637B. The two APs 620, 630 provide wireless network connectivity to wireless devices such as device 640. Each AP 620, 630 has an associated axis of orientation 626, 636 defined based on an origin point for the AP and an axis corresponding to the maximum signal strength of main lobe 625, 635, respectively.

First AP 620 is located at a first position x1, y1 and its orientation with respect to the x, y coordinates is measured by a known angle α, defined as the angle between axis of orientation 626 of first AP 620 and the y-axis. As explained in greater detail below, first AP 620 may be defined to be an anchor AP having a known location defined by coordinates x1, y1 and a known orientation angle α with respect to y-axis 610. In some examples, first AP 620 is aligned with the x, y coordinates 605, 610 respectively, and in such examples, the orientation angle α would be zero. In other examples, the first AP 620 is an anchor AP and the orientation angle α is a known value with respect to the y-axis 610. The second AP, AP2, 630 has a known location defined by coordinates x2, y2 and its orientation is measured by an angle β, defined as the angle between axis of orientation 636 of AP2 630 and the y-axis 610. In accordance with one or more techniques of the disclosure, the x, −y coordinate locations of each one of the APs 620, 630 are assumed to be known from precise manual measurements of the AP locations taken during a site survey or by automatic determination of the AP locations by a location engine 344, such as shown in FIG. 3B. Example systems and techniques for automatically determining locations of deployed APs are described in U.S. Provisional Application No. 63/243,616 filed Sep. 13, 2021, and entitled, "Determining Locations of Deployed Access Points," which is incorporated by reference herein in its entirety.

In accordance with one or more techniques of the disclosure, a computing device, such as NMS 300 and/or AP orientation engine 350 as shown in FIGS. 3A-3B, determines the orientation angle, β, of a second AP based on received signal strength measurements of wireless signals transmitted by a first AP and received by the second AP. In the example of FIG. 6, each AP 620 and 630 includes a single antenna. In other examples, each AP may include one or more antennas, and the orientation engine determines the orientation angle, β, of the second AP based on received signal strength measurements of wireless signals transmitted by the one or more antennas of the first AP and received by the one or more antennas of the second AP. In the example of AP having multiple antennas, one of the antennas of each AP is designated as the reference antenna with which to measure the orientation of the AP with respect to the x, −y reference frame. It shall be understood that FIG. 6 illustrates one example technique for measuring the positions and orientations of APs 620, 630, and that the positions and orientations may be defined using other methods, and that the disclosure is not limited in this respect.

The angle θ defines the angle between the two APs. The angle θ is unrelated to the orientation angles α and β, but instead refers to the angle between the two APs determined based on the known coordinate locations of the two APs:

$$\theta = \text{Arctag}(y_1 - y_2)/(x_1 - x_2) \quad \text{Eq. 1}$$

where:

Arctag a mathematical function that is the inverse of the tangent function, $x_1$, $y_1$ x, y, coordinates of first AP, and $x_2$, $y_2$ x, y, coordinates of second AP.

Referring to the Friis formula:

$$Pr = Pt^* Gt^* Gr^* (\lambda/(4^*\pi^*d))^2 \quad \text{Eq. 2}$$

where:

Pr a received power of a signal at the receiving antenna,

Pt a transmission power of the signal,

Gt a gain of a transmit antenna as measured toward the receiving antenna,

Gr a gain of the receiving antenna towards the transmitting antenna,

λ wavelength of the radio signal, and d a distance between the transmitter and the receiver.

To change the units to decibels (dB), Eq. 1 is modified as shown below by applying the log function to both sides of Eq. 1:

$$Pr = Pt + Gt + Gr + 20^* \text{Log}(\lambda/(4^*\pi^*d)) \quad \text{Eq. 3}$$

The distance d is a function of the known location of the two APs:

$$d = f(x_1, y_1, x_2, y_2) \quad \text{Eq. 4}$$

And more precisely:

$$d = \sqrt{(x1 - x2)^2 + (y1 - y2)^2} \quad \text{Eq. 5}$$

where:

$x_1$, $y_1$ x, y, coordinates of first AP, and $y_2$, $y_2$ x, y, coordinates of second AP.

When the radio wave from the transmitting antenna travels towards the receiving antenna through a medium with multiple reflections (e.g., environment with multipath) Eq. 3 takes the form of:

$$Pr = \text{Int} - \text{PLE}^* \text{Log}(d) \quad \text{Eq. 6a}$$

$$Pr = Pt + Gt + Gr + 20^* \log(\lambda/(4^*\pi)) - \text{PLE}^* \text{Log}(d) \quad \text{Eq. 6}$$

where:

PLE typically 20<PLE<60 depending on the characteristics of the multipath.

Equation 6 can then be re-written as:

$$Pr = A + Gt + Gr \quad \text{Eq. 7}$$

where:

$$A = Pt + 20^* \log(\pi/(4^*\pi)) - \text{PLE}^* \text{Log}(d). \quad \text{Eq. 8}$$

The gains of the receiving (Gr) and transmitting (Gt) antennas are functions of the angle by which the respective signal is transmitted or received with respect to the main lobe of the transmitting and receiving antennas. Assuming for purposes of illustration that AP1 is the transmitting AP and AP2 is the receiving AP:

$$Gt = f(\alpha, \theta, \varphi_t) \quad \text{Eq. 9}$$

$$Gr = f(\beta, \theta, \varphi_r) \quad \text{Eq. 10}$$

where:

α orientation angle of transmitting AP with respect to reference coordinates,

β orientation angle of receiving AP with respect to reference coordinates,

θ angle introduced by relative locations of APs, $\varphi_t$ Elevation angle of transmitter, and $\varphi_r$ Elevation angle of receiver.

For sake of simplicity, the transmitting AP and the receiving AP are assumed to be installed parallel to the ceiling and as such both of the angles $\varphi_t$ and $\varphi_r$ are assumed to be zero, or 90 degrees in another coordinates. Using this assumption, Equations 9 and 10 become $$Gt=f(\alpha,\theta) \qquad \text{Eq. 11}$$

$$Gr=f(\beta,\theta) \qquad \text{Eq. 12}$$

FIG. 7A illustrates an example antenna gain table. The gains of the transmitting and receiving antennas in any direction depend on the physical structure of the antennas and can be described in a table such as the one described in FIG. 7A. Rows 710 provide entries for various antenna gains based on the values of the angle α. For example, rows 711, 712, ... 718, 719 provide antenna gain entries for angles of orientation α1, α2, ..., α(n−1), αn, respectively. Similarly, columns 720 provide entries for various antenna gains based on the values of the angle θ. For example, columns 721, 722, ... 728, 729 provide antenna gain entries for θ1, θ2, ..., θ(m−1), θm, respectively. It should be noted that similar antenna gain tables can be made for the other AP, wherein the angle α is replace by the angle β.

The gain of the antenna in any direction is a function of the angle between the main lobe of the antenna (defined, e.g., by the axis of orientation 626, 636 for AP1 and AP2, respectively) and the direction towards the other (receiving or transmitting) antenna. We will call this angle ψ. The angle ψ is an aggregation of angle θ and the orientation angle between the AP and the reference coordinates (α or β for the transmitting and the receiving antennas, respectively).

FIG. 7B illustrates an example table that provides the values of the antenna gain as a function of the angle ψ between the main lobe of the transmitting/receiving antenna and the other receiving/transmitting antenna. Row 740 provides the angles between the main lobe of the transmitting/receiving antenna and the direction towards the other (receiving/transmitting) antenna. Specifically, entries 741, 742, ..., 748, 749 provide values for the angles ψ₁, ψ₂, ..., ψ(m−1), ψ_m. Row 750 provides the corresponding antenna gains in the respective directions, specifically, G1, G2, ..., G(m−1), Gm.

The accuracy of methods that utilize tables such as tables shown in FIGS. 7A and 7B are prone to digitization errors. To avoid this issue, techniques of the disclosure determine a continuous harmonic sphere function that model the antenna patterns and provide a close approximation of the gain values in tables such as those shown in FIG. 7A and FIG. 7B.

For sake of simplifying the explanation, the example of FIG. 6 shows two APs 620, and 630 each having a single antenna including a main lobe 625, 635, respectively. The direction in which the main lobe points (the axis of orientation) was illustrated by arrows 626 and 636. In other example implementations, an AP may include n different antennas, each pointing in a different direction. The n antennas may be orientated at, for example, 360/n degrees with respect to each other. For example, when n=8, the eight different antennas of the AP may be oriented 45 degrees with respect to each other such that the 8 antennas point at 0, 45, 90, 135, 180, 225, 270, 315 degrees with respect to the coordinates of the AP.

Figure 8:
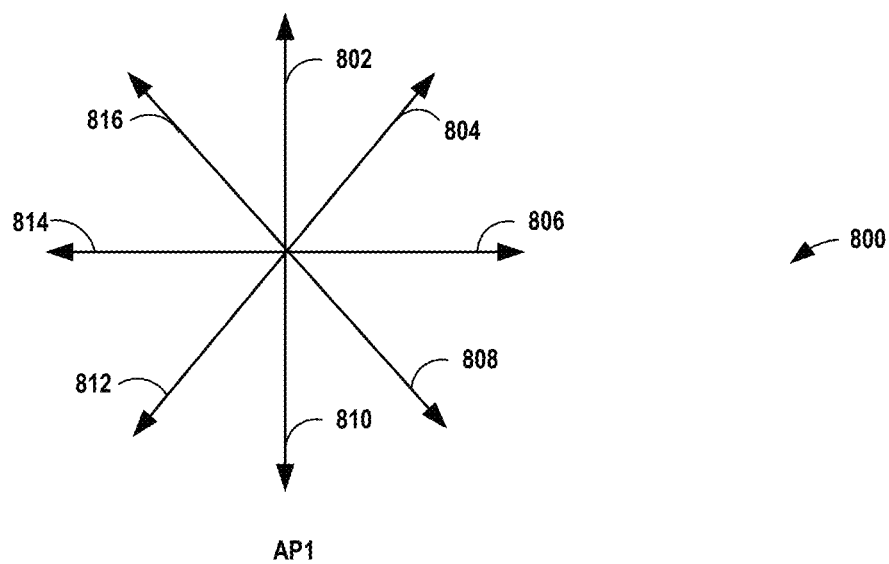
FIG. 8 shows the orientation of the main lobes of two APs with multiple antennas.
Figure 8:
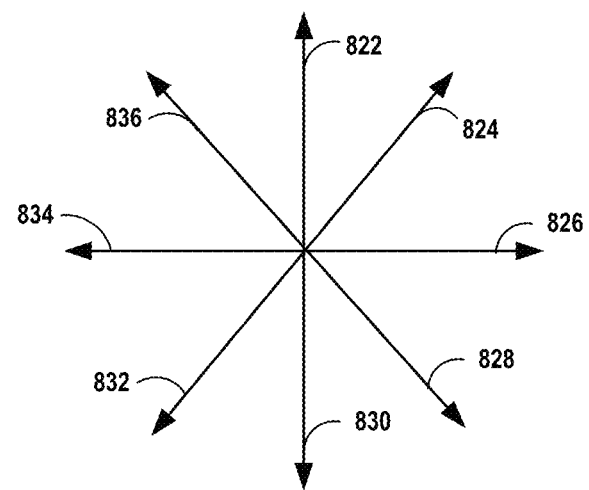

FIG. 8 provides a simplified illustration of main lobe directions of two APs, AP1 and AP2, each with 8 antennas. Each antenna broadcasts a wireless signal having a radiation pattern having a main lobe and two side lobes, such as shown in FIG. 6. The gain of each antenna can be modeled by the tables shown in FIGS. 7A and 7B, or, in accordance with one or more techniques of the disclosure, by a spherical harmonics function as detailed above. AP1 has eight antennas a1-1, a1-2, ..., a1-7, a1-8 the main axis of each of the eight antennas is illustrated as 802, 804, ..., 814, 816, respectively. Similarly, AP2 has eight antennas a2-1, a2-2, ..., a2-7, a2-8, and the main axis of each of the eight antennas is illustrated as 822, 824, ..., 834, 836, respectively.

During operation, transmission from each one of the n antennas of AP1 can be received by any one or more of the n antennas of AP2. Therefore, each transmission from an antenna of AP1 generates 8 different RSSI measurements indicative of the power received by each one of the 8 antennas of AP2. Altogether, using each one of the n antennas of AP1 to transmit a wireless signal and measuring the corresponding received signals by each one of the antennas of AP2 results in $n^2$ RSSI measurements. Using the example above of APs with 8 antennas, transmitting eight wireless signals by the eight antennas of AP1 and receiving each of the eight signals by each one of the n antennas of AP2, respectively, yields 64 RSSI measurements, wherein each RSSI measurement is the RSSI of the wireless signal transmitted by one of the antennas of AP1 as received by one of the antennas of AP2.

Figure 9:
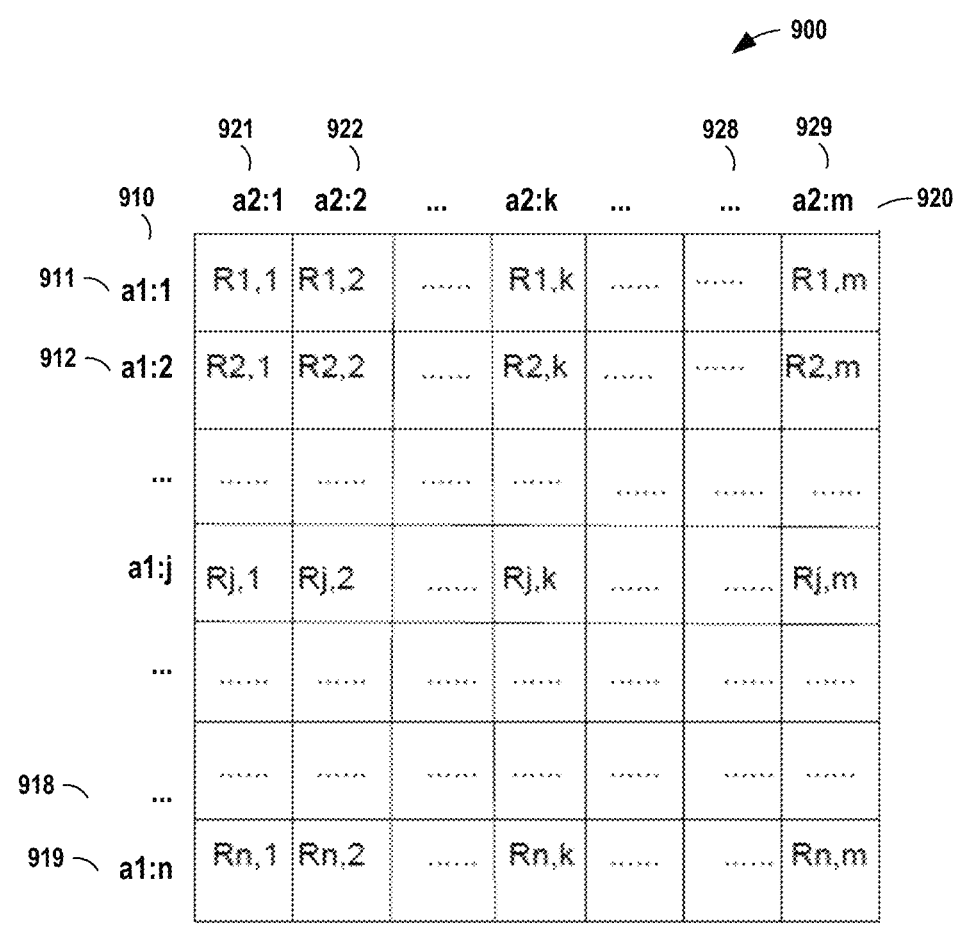

FIG. 9 provides a simplified illustration of tables storing such received signal strength measurements. Rows 910 provide entries for various antennas of AP1 having n antennas (e.g., a1:1, a1:2, ..., a1:n). For example, rows 911, 912, ..., 918, 919 provide RSSI values resulting from transmission by antennas a1:1, a1:2, ..., a1:n, of AP1, respectively. Similarly, columns 920 provide entries for various antennas of AP2 having m antennas. For example, rows 921, 922, ..., 928, 929 provide RSSI values resulting from received radio signals by antennas (e.g., a2:1, a2:2, ..., a2:m) of AP2. In general, table 900 indicates that the RSSI Rj,k is a result of radio signal transmitted by antenna j of AP1 and received by antenna k of AP2. As explained above with reference to Equations 11 and 12, these signals are a function of the angle θ between the APs AP1 and AP2, the orientation angle α of AP1 with respect to the reference coordinate system (assumed to be 0 degrees in some examples), the orientation angle β of AP2 with respect to the reference coordinate system, as well as the angle between the j and k antenna of each AP with respect to the direction of the main lobe of the first antennas, e.g., directions 802 and 822.

Substituting Equations 11 and 12 in Equation 7 yields:

$$Pr=A+f(\alpha,\theta)+f(\beta,\theta) \qquad \text{Eq. 13}$$

where:

Pr expected RSSI resulting from transmission and receiving antennas having orientation angles of α and β, respectively, with respect to the reference coordinates.

When APs with multiple antennas, such as those described with reference to FIG. 8, are used, the angles α and β are adjusted accordingly to reflect the angles between the corresponding antennas. For example, assuming the antennas are equally spaced, the angles are adjusted by the indexes j*360/n for the transmitter AP and by k*360/n for the receiver AP based on the indices j and k of the antennas of the transmitting and receiving APs. (Please note that the indices j and k can take the values of 0, 1, 2, ..., n−2, n−1.)

In some examples, a transmitting AP periodically transmits a signal from each one of its n antennas. Each transmitted signal is received by the n antennas of the receiving AP (assuming in this example that both APs have the same number of antennas). The strength of the received signal, e.g., the RSSI, is measured and recorded by the receiving AP, resulting in a vector of nn RSSI measurements. We will denote this vector of RSSIs as "VR."

Using Equation 13 for each one of the pairs of transmitting and receiving antennas of the corresponding APs, one can establish an n*n vector for the expected RSSI values based on the estimated orientation angle, $\alpha$, of the transmitting AP, and the orientation angle, $\beta$ of the receiving AP. Each element of the expected vector can be expressed by:

$$Pr_{j,k} = A + f(\alpha_j, \theta) + f(\beta_k, \theta) \qquad \text{Eq. 14a}$$

where:

$Pr_{j,k}$ expected RSSI resulting from transmission antenna j and receiving antenna k, $\alpha_j$ angle of the $i^{th}$ transmitting antenna, $\beta_k$ angle of the $j^{th}$ receiving antenna, j, k indices of the transmitting and receiving antennas ranging between zero and n−1, $\theta$ known angle based on the locations of the two APs, and $$\alpha_j = \alpha_0 + j*360/n. \qquad \text{Eq. 14b}$$

$$k = \beta_0 + k*360/n \qquad \text{Eq. 14c}$$

Figure 10:
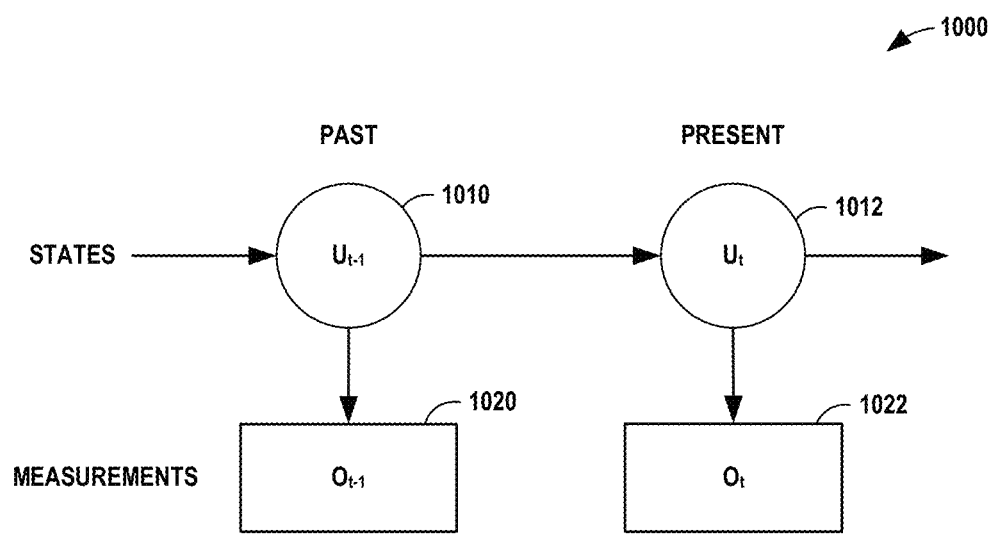
FIG. 10 illustrates a Recursive Bayesian Estimation system used to determine orientations of deployed APs, in accordance with one or more techniques of the disclosure.

FIG. 10 illustrates a Recursive Bayesian Estimation system 1000. Unobserved states $U_{t-1}$ 1010 and $U_t$ 1012 represent unobserved states of the system 1000 at times t−1 and t, respectively. Observed states $O_{t-1}$ 1020 and $O_t$ 1022 represent observed states of the system 1000 at times t−1 and t, respectively.

In accordance with one or more techniques of the disclosure, the observed states are signal strength measurements of signals originating from a plurality of wireless transmitters (e.g., antennas of transmitting APs), and received by a wireless receiver device (e.g., antennas of receiving other APs). In the examples described herein, x, y coordinate locations of the plurality of APs within a reference coordinate system are known.

Observed states are mathematically represented via Equation 15 below:

$$O_i(t) = \{SS_{i,1}, SS_{i,2}, \ldots SS_{i,j-1}, SS_{i,j}, SS_{i,j+1}, \ldots \\ S_{i,n}\} = \{SS_j\}_1^n \qquad \text{Eq. 15}$$

where:

$O_i(t)$ a measured (observed) state vector by antenna i at time t, $SS_{i,j}$ a signal strength of a signal originating at $j^{th}$ antenna of a transmitting AP, as measured by $i^{th}$ antenna of a receiving AP. The signal strength measurement associated with time t, j an index identifying a specific transmitting antenna, with antennas numbered from 1 to n, and n a number of antennas from which the $i^{th}$ antenna receives a signal.

Unobserved or inner states are represented by Equation 16 below:

$$U_t = f(\beta, PLF)_t \qquad \text{Eq. 16}$$

where:

$U_t$ an unobserved state at time t, $\beta$ an unobserved orientation of receiving AP at time t, and PLF path Loss function (PLF) parameters at time t which are known as PLE and INT (e.g., parameters of Eq. 8).

The techniques of the disclosure provide for estimating the unknown states to provide an estimate of the orientation, $\beta$, of the receiving AP and time dependent values for the PLF parameters (e.g., A in Eq. 8 above).

According to the techniques of the disclosure, the orientation, $\beta$, of the receiving AP is determined based on the known orientation angle, $\alpha$, of a transmitting anchor AP, the known location of the transmitting anchor AP, the known location of the receiving AP, and the RSSIs of the wireless signals transmitted by the antennas of the transmitting anchor AP as received by the antennas of the receiving AP. Once the orientation, $\beta$, of the receiving AP is determined, that AP may become an anchor AP and can be used for determination of the orientation of other APs in the wireless network.

Although for simplicity of illustration the examples below describe determining orientations of deployed APs while assuming that the elevation angles $\varphi_r$ and $\varphi_t$ are zero, it shall be understood that these techniques of the disclosure also include determining an orientation of a deployed AP when the AP is not mounted parallel to the ceiling, and the disclosure is not limited in this respect.

The techniques of the disclosure represent the problem as a Bayesian equation, which facilitates determination of values for the unobserved states. The determination is based on values of the observed states discussed above:

$$P(U_t \mid O_t) = \frac{P(O_t \mid U_t) \cdot P(U_t)}{P(O_t)} \qquad \text{Eq. 17}$$

where:

$P(U_t|O_t)$ a posterior probability, or a probability that the unobserved states assume a specific value given the observed signal strength measurements, $P(O_t|U_t)$ a probability that the measured states have a specific value given that the unobserved states have a specific value. This probability is often referred to as likelihood, $P(O_t)$ a probability that the measured states have a specific value. This probability generally has a specific constant value, and $P(U_t)$ a prior probability that the unobserved states have specific values, this probability is referred to as prior.

To determine the orientation of the receiving wireless device (e.g., angles $\alpha$ and/or $\beta$) at a specific time, at least some of the disclosed examples determine values of the parameters that maximize a probability of:

$$P(U_t|O_t) \qquad \text{Eq. 18}$$

Or represented in another manner:

$$q_{u_t} = \text{Argmax}\{P(u_t|o_t) - P(o_t)\} = \text{Argmax}\{P(o_t|u_t) - P(u_t)\} \qquad \text{Eq. 19}$$

where:

$q_{u_t}$ arguments that maximize the probability $P(u_t|o_t)$.

As explained with reference to Equation 17 above, a probability $P(O_t)$ assumes a specific constant value and therefore does not affect a determination of the values of the arguments that maximize the probability of Equation 19. Similarly, since $P(u_t)$ can be assumed as a non-informative prior which is equal to one, a constant value, it also does not affect the above mentioned determination of arguments that maximize the probabilities of Equation 19. Thus, Equation 19 can be simplified into Equation 20 below:

$$q_{u_t} = \text{Argmax}\{P(u_t|o_t)\} = \text{Argmax}\{P(o_t|u_t)\} \qquad \text{Eq. 20}$$

As indicated above with reference to Equation 15, the observed states are the signal strength measurements of signals originating at each one of the n antennas of a first AP as received by each one of the n antennas of a second AP. Assuming that angles $\alpha$ and $\theta$ are known or can be calculated, the unobserved parameters/variables are $\beta$ (e.g., the orientation angle of the second AP with respect to the reference coordinate system) and $PLF_t$.

Since the signal strengths are mostly independent from each other, a probability $P(u_t|o_t)$ of the unobserved states having particular values given the observed states can be represented as the multiplication of the individual probabilities of each one of the signal strength values. Such a representation is shown below with respect to Equation 21:

$$P(o_t|u_t) = \Pi_{i=1}^{n} \Pi_{j=1}^{m} Pdf(ss_{ij}(\beta, PLF)_t) \qquad \text{Eq. 21}$$

where:
Pdf is a probability distribution function,
$ss_{ij}$ a signal strength measurement (e.g., RSSI),
i an index representing a particular wireless transmitter,
j an index representing a particular wireless receiver,
β an orientation of the wireless device in a coordinate system,
PLF an unknown set of path loss function parameters.
n number of transmitting antennas in first AP, and
m number of receive antennas in second AP.

As described above, it should be noted that angles α and θ are assumed in some examples to be either known or calculated fixed values and as such are not considered to be unknown state variables that need to be determined.

In some examples, the probability distribution function, Pdf, of Equation 21 is a Gaussian probability distribution function. In some other examples, Pdf is a Nakagami probability distribution function. In some other examples, Pdf is a Rician probability distribution function. The use of other probability distribution functions not listed here is also contemplated, and the disclosure is not limited in this respect.

The probability distribution function Pdf introduced in Equation 21 above is indicative of a probability that a wireless device (e.g., an AP) mounted at a particular orientation, β, would receive a signal with the measured signal strength $SS_{ij}$ at antenna j of the wireless device from a specific wireless transmitter antenna indicated by the index i. As example Pdf function is shown below as Equation 22:

$$f(SS_{i,j}) = \frac{1}{\sigma\sqrt{2\pi}} e^{-\frac{1}{2}\left(\frac{SSij - \mu}{\sigma}\right)^2} \qquad \text{Eq. 22}$$

where:
$SS_{i,j}$ is an example value in the distribution (e.g., a signal strength measurement)
μ is an expected mean of the values (e.g., a mean of signal strength measurements associated with a particular time period of signal from transmitter i received by receiver j), which in this case is "Int+PLE*log (d), and
σ is a standard deviation of the signal strength measurements.

The example Pdf function of Equation 22 implements a Gaussian distribution. As discussed above, other distribution functions are also contemplated, and the disclosure is not limited in this respect.

The $SS_{i,j}$ value in Equation 22 represents an individual (measured) value of the distribution, such as a signal strength value. The expected signal strength value μ for a signal transmitted from a wireless transmitter is provided by the right hand side of Equation 13. Substituting this value in for the $SS_{i,j}$ value of Equation 22 yields Equation 23 below. In some examples, the standard deviation of Equation 22 is set to a predetermined value. In some examples, a standard deviation value (e.g., a) is determined as explained in greater detail below.

A result of combining Equation 22 above with Equation 13 is provided below:

$$Pdf(SS_{i,j}, Pr) = \frac{1}{\sigma\sqrt{2\pi}} e^{-\frac{1}{2}\left(\frac{Pr - SS_i}{\sigma}\right)^2} \qquad \text{Eq. 23}$$

where:

$Pr = A + f(\alpha, \theta) + f(\beta, \theta)$ $SS_{i,j}$ a measured signal strength received by the $j^{th}$ antenna of a second AP originating from a transmitting $i^{th}$ antenna of a first AP, and
Pdf ($SS_{i,j}$, Pr) a probability that a wireless device (e.g., an AP) having an orientation angle, β, receives a signal with a signal strength $SS_{i,j}$ from a transmitter with a known orientation angle, α, a location based known angle between the transmitting and receiving APs θ, and the signal path between the wireless device and the transmitter has characteristics defined by A.

In some examples, the techniques of the disclosure derive values of unobserved states that maximize a value of a probability of Equation 21. Equation 21 can therefore be mapped into a logarithmic domain where the multiplication of the exponential probability distribution function is converted into a summation of the various probabilities, resulting in a search of variables that maximize Equation 24 below:

$$\ln(P(o_t|u_t)) = \sum_{i=1}^{n} \sum_{j=1}^{m} \ln(Pdf(SS|(\beta, PLF)_t)) \qquad \text{Eq. 24}$$

We will refer to the function shown in Equation 24 as the logarithmic likelihood probability. Applying Equation 24 to Equation 20 results in Equation 25 below:

$$\text{Argmax}\left\{\sum_{i=1}^{n} \sum_{j=1}^{m} \ln(Pdf(SS|(\beta, A, PLF)_t))\right\} = (\beta, PLF)_t \qquad \text{Eq. 25}$$

In some examples, the techniques of the disclosure determine an orientation angle (e.g., β) of a receiving AP that maximizes the probability represented by the expression of Equation 25. The PLF parameter(s) can include one or more unknowns depending on the example. In some examples, the PLF parameter(s) include a path loss exponent parameter (e.g., PLE). In some examples, the PLF parameter(s) include an intercept parameter (e.g., Int). In some examples, the intercept parameter includes one or more components, including one or more of a frequency of the wireless signal, and/or a transmit power parameter (e.g., Pt). Some examples solve for one or more of these parameters and/or other unknown parameters not shown in Equation 25. For example, some examples solve for one or more parameters that control the probability distribution function (e.g., control parameters such as a standard deviation, variance, or other parameters that control how the distribution is generated). For example, in some examples, a variance or sigma (σ) of Pdf is treated as an unknown variable or an unobserved state and solved for.

In addition to the selection of a specific distribution function, some examples determine parameters that are specific to a type of probability distribution function utilized by the example. For example, in some examples utilizing a Gaussian distribution, a variance $\sigma^2$ is derived.

In some examples, the computing device solves Equation 25 (that is, determines an orientation angle, $\beta$, that maximizes the probability given by Equation 25) by utilizing a grid search method, e.g., a gradient ascent algorithm, which is a fast and computationally inexpensive iterative optimization algorithm for determining a maximum of a function. Other examples may utilize other computational methods of determining a maximum of a function, and the disclosure is not limited in this respect. In the example below, the derivative of Equation 25 is used in an iterative manner to determine the arguments (parameters) that maximize the probability associated with the observed states, e.g., the measured RSSI values. The derivative is given by:

$$\frac{d}{d(\beta, PLF)}\left(\sum_{i=1}^{n}\sum_{j=1}^{m}\ln(Pdf(ss_{ij}|(\beta, PLF)_t))\right) = \quad \text{Eq. 26a}$$

$$\sum_{i=1}^{n}\sum_{j=1}^{m}\frac{d}{d(\beta, PLF)}\ln(Pdf(ss_{ij}|(\beta, PLF)_t))$$

And more specifically, $$\frac{d}{d(\beta)}\left(\sum_{i=1}^{n}\sum_{j=1}^{m}\ln(Pdf(ss_{ij}|(\beta, PLF)_t))\right) = \quad \text{Eq. 26b}$$

$$\sum_{i=1}^{n}\sum_{j=1}^{m}\frac{d}{d(\beta)}\ln(Pdf(ss_{ij}|(\beta, A, PLF)_t))$$

$$\frac{d}{d(Int)}\left(\sum_{i=1}^{n}\sum_{j=1}^{m}\ln(ss_{ij}|(\beta, PLF)_t)\right) = \quad \text{Eq. 26c}$$

$$\sum_{i=1}^{n}\sum_{j=1}^{m}\frac{d}{d(Int)}\ln(Pdf(ss_{ij}|(\beta, PLF)_t))$$

$$\frac{d}{d(PLE)}\left(\sum_{i=1}^{n}\sum_{j=1}^{m}\ln(Pdf(ss_{ij}|(\beta, PLF)_t))\right) = \quad \text{Eq. 26d}$$

$$\sum_{i=1}^{n}\sum_{j=1}^{m}\frac{d}{d(PLE)}\ln(Pdf(ss_{ij}|(\beta, PLF)_t))$$

In accordance with one or more techniques of the disclosure, to identify values of the unknowns that maximize the probability represented by Equation 25, some examples search for values that result in first derivatives (as represented by Equations 26a-d) that equal zero or equals a value within a predefined threshold of zero.

Once the derivatives with respect to each unknown variable of Equations 26a-d are evaluated, in some examples, the computing device applies a gradient ascent technique to identify values that result in the derivatives being equal to zero. The gradient ascent method performs iterations represented by the index k below with respect to Equations 27a-c:

$$\beta_k = \beta_{(k-1)} - \delta * \left(\sum_{i=1}^{n}\sum_{j=1}^{m}\frac{d}{d(\beta)}\ln(Pdf(ss_{ij}|(\beta, PLF)_t))\right) \quad \text{Eq. 27a}$$

$$Int_k = Int_{(k-1)} - \delta * \left(\sum_{i=1}^{n}\sum_{j=1}^{m}\frac{d}{d(Int)}\ln(Pdf(ss_{ij}|(\beta, PLF)_t))\right) \quad \text{Eq. 27b}$$

$$PLE_k = \quad \text{Eq. 27c}$$
$$PLE_{k-1} - \delta * \left(\sum_{i=1}^{n}\sum_{j=1}^{m}\frac{d}{d(PLE)}\ln(Pdf(ss_{ij}|(\beta, PLF)_t))\right)$$

where:
$\delta$ a scale factor to moderate a step size between each iteration of the gradient ascent.

In accordance with one or more techniques of the disclosure, the equations above assume that the orientation angle, $\alpha$, of the first AP is known. This AP is defined as an anchor AP. As such, the orientation engine does not need to determine the orientation of the anchor AP (e.g., a is known). Once the equations above are used to determine the orientation angle (e.g., $\beta$), of the second AP, the second AP may also be considered an anchor AP for purposes of determining the orientations of one or more other APs in the wireless network. The orientation engine may thus use a newly derived AP orientation to determine the orientation of the one or more other APs until the orientations of all of the APs are determined.

In accordance with other example techniques of the disclosure, the orientation engine may use multiple anchor APs to increase the accuracy of the determined orientations. For example, the method may use, e.g., 2, 3, 4, or more anchor APs to determine the orientation of the next AP.

In accordance with other example techniques of the disclosure, the orientation engine may iteratively increase (can be limited to a specific threshold) the number of anchor APs that are used to determine the orientation of the next AP.

It should be noted that though Equations 26 and 27 provide determination of a single orientation angle $\beta$ (otherwise referred to as yaw or rotation about the z-axis), some examples use a similar set of equations to determine the roll (rotation about the y-axis) and/or the pitch (rotation about the x-axis) orientation angles.

In another example, the orientation angle of an anchor AP is used to determine the orientation of two or more neighboring APs. In such examples, multiple equations like those described in Equations 26 and 27 may be used.

The value of A from Equation 8 can be determined based on the known transmission power, Pt, and the known distance between the APs, d, per Equation 5. The value of the PLE parameter can be set to a constant value (e.g., between 20 and 60) or otherwise estimated based on techniques such as those described in U.S. Provisional Application No. 63/125,595 filed Dec. 15, 2020, entitled, "Determining Location Based on Dynamic Path Loss Exponent (PLE) and Intercept (Int) Estimation," which is incorporated herein by reference in its entirety.

It should be noted that because the gain of the lobes of the antennas in any direction is defined as a continuous spherical harmonic function their values can be estimated for each one of the antenna pairs at specific values of $\alpha_j$ and $\beta_k$ depending on the specific antenna pair used for measuring the specific RSSI signal transmitted from antenna j of the transmitting AP and received by the antenna k of the receiving AP. In addition, the derivative of the antenna gain with respect to any of the abovementioned variables can be accurately determined without introducing any digitization errors.

As discussed above, in some examples, the techniques described herein start with one or more anchor APs which is/are defined to have an orientation of zero (e.g., $\alpha=0$), or alternatively some known orientation, with respect to the reference frame. In other words, the reference frame is defined to align with the orientation of the anchor AP(s). As such, the orientation angle $\alpha_0$ of an anchor AP having n antennas is defined to be zero and the other n−1 antennas of the anchor AP are defined to be at angles 360/n, 2*360/n, 3*360/n, . . . , (n−1)*360/n. In examples in which the antennas of the anchor AP are not equally spaced, the other n−1 antennas of the anchor AP are defined to be at the known orientation angles $\alpha_1 \ldots \alpha_{n-1}$ of the antennas. The same holds true for non-anchor APs for which the orientation is to be determined.

Using the anchor AP, the techniques of the disclosure determine the orientation angle of a second AP with reference to the anchor AP and thus, in this example, with reference to the reference coordinates. The anchor AP can be used to determine the orientation of one or more other APs which can receive signals from the anchor AP and measure their corresponding signal strength, e.g., RSSI. These may be referred to as neighbor APs to the anchor AP. In accordance with one or more techniques of the disclosure, once the orientation of the neighbor APs to the one or more anchor APs are determined, the orientation engine can continue to evaluate the orientation of the APs which are first neighbors of the anchor APs (that is, neighbors to the neighbors of the anchor AP) using the determined orientation angles of the neighbor APs.

In some examples, once the method determined the orientation of additional APs, the method may expand the method described above and determine the orientation of a new AP by using the RSSI signals from more than one AP, e.g., p APs. In such case, the receiving AP may receive p*n signals (the total number of signals transmitted by the p APs) at each one of its n antennas resulting in a vector of $p*n^2$ RSSI signals. Using multiple APs with known or otherwise estimated orientation angles to estimate the orientation of another AP increases the accuracy of the estimated orientation but may increase the computational complexity of the method.

In some examples, the orientation engine iteratively determines the orientation angle having a maximum probability (e.g., whether the derivative(s) have a zero value by evaluating any one or more of Equations 27a, 27b, and 27c). The index k is incremented until a difference in estimated values of the unknown parameters from a previous iteration is smaller than a predefined threshold. In some examples, a change in a parameter's estimated value is compared to a threshold specific to the particular parameter. If all parameters being estimated changed by an amount less than their respective threshold, then the gradient ascent is considered complete or converged. At convergence, an optimal value(s) of the $\beta$ variable has been identified. This convergence indicates a specific orientation angle, $\beta$, of an AP with respect to the reference coordinates. In some examples, the algorithm assumes that an optimal solution has been found when, with each additional iteration, the polarity of the derivative fluctuates between positive and negative values below a predetermined threshold.

Figure 11A:
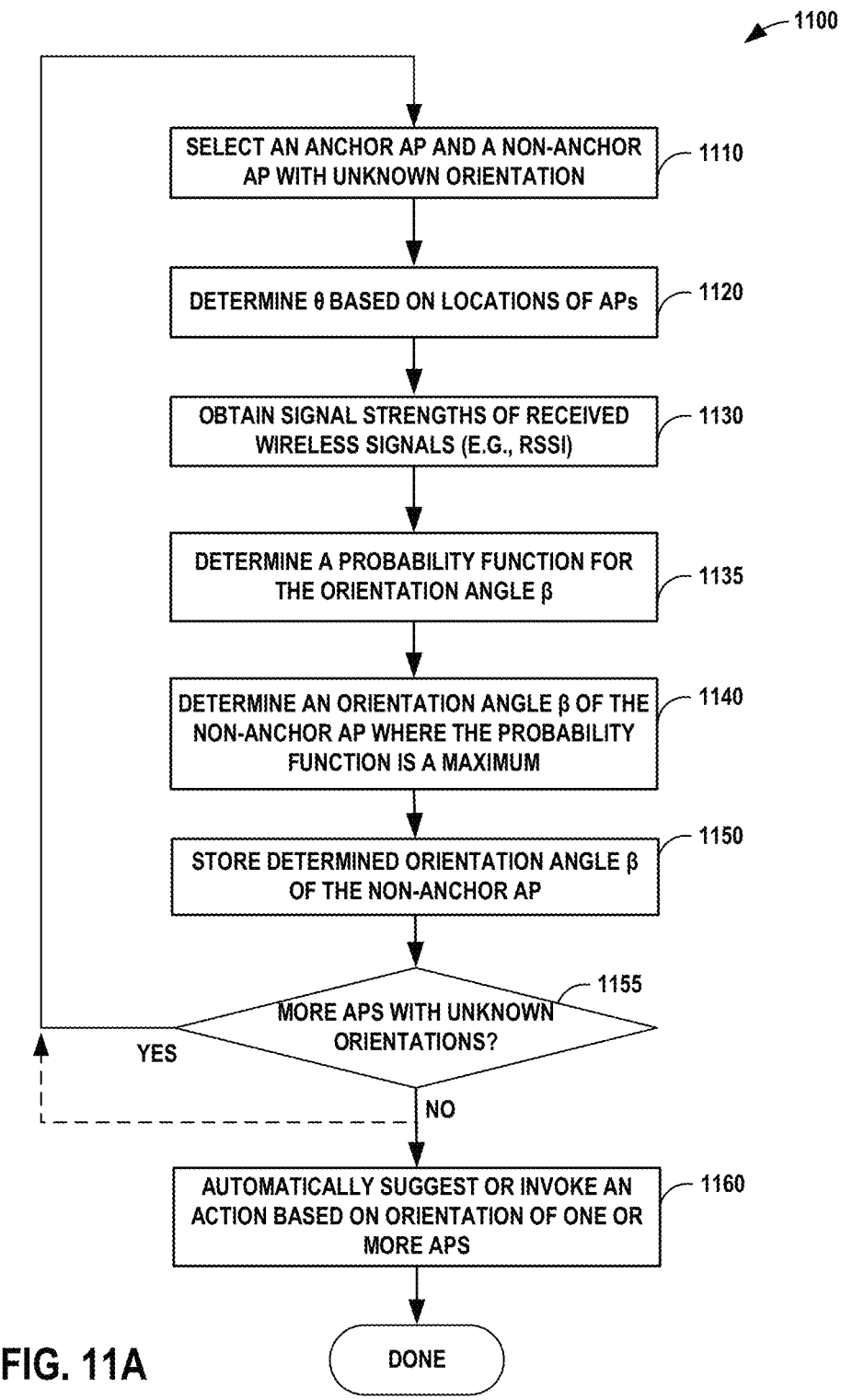
FIG. 11A-11C are flowcharts illustrating an example process by which a computing device may determine orientations of one or more deployed APs, in accordance with one or more techniques of the disclosure.

FIG. 11A is a flowchart of an example process (1100) by which a computing device automatically determines the orientation of one or more deployed APs, in accordance with one or more techniques of the disclosure. In some examples, the computing device includes one or more processor(s) of a network management system and/or an AP orientation engine, such as processor(s) 306 of NMS 130/300 as shown in FIGS. 1A-1B and/or FIGS. 3A-3B, and/or processors 396 of AP orientation engine 350 as shown in FIGS. 3A-3B. In such examples, the deployed APs may include APs 142/200 as shown in FIGS. 1A and/or FIG. 2, or any other devices in a wireless network, such as wireless networks 106 as shown in FIGS. 1A-1B. However, it shall be understood that the example of a wireless network is described herein for illustrative purposes only, and that the disclosure is not limited in this respect. In addition, although process (1100) is described as being executed out by NMS 136/300, any computing device or group of computing devices, such as any one or more of APs 142/200, servers 128, network node 500 etc., may execute the functions described herein, and the disclosure is not limited in this respect. In some examples, one or more of the functions discussed below with respect to FIG. 11A may be performed by any of hardware processors 206, 306, 396, 406, or 506. In some examples, an orientation determination module (e.g., 380) stored in a memory (e.g., 212, 312, 362, 412, 512) configure the hardware processor to perform one or more of the functions discussed below.

Example process (1100) of FIG. 11A automatically determines orientations of one or more APs in a wireless network environment. The example process provides for improved accuracy in orientation determinations relative to other methods that do not utilize the locations of the AP to determine the orientation of an AP. In some examples, example process (1100) automatically determines unknown orientations of deployed APs relative to a reference coordinate system. The reference coordinate system may be established relative to the site at which the wireless network is deployed, or may be established with respect to one or more anchor APs, or may be established with respect to any other appropriate reference frame.

The computing device selects at least one anchor AP having a known orientation and a non-anchor AP whose orientation is to be determined (1110). Further details on selection of the at least one anchor AP and the non-anchor AP is described below with respect to FIG. 1 IC. In some examples, the selected non-anchor AP whose orientation is to be determined is a neighbor of the selected anchor AP. In general, a second AP is considered to be a neighbor of a first AP if it receives signals from the first AP with signal strength greater than a predetermined threshold value. In some examples, the signal strength measurements are in the form of received signal strength indications (RSSIs). In general, the signal strength measurements are of signals generated by a plurality of wireless transmitters. In some examples, at least some of the wireless transmitters are included in APs and the receivers are included in other APs. As described above, the x, y coordinate locations of the APs in the reference coordinate system are known, the orientation angle, $\alpha$, of the anchor AP(s) are known and the orientation angle, $\beta$, of the (non-anchor) APs are unknown. As discussed above, the known location(s) of the APs is determined, in some examples, by precise manual measurement or by automated methods.

The computing device determines the value of the angle, $\theta$, between the anchor AP and the non-anchor AP based on the known locations of the two APs (1120). For example, based on the known x, y coordinate locations of the anchor AP and the non-anchor AP, the angle between the APs, $\theta$, can be determined using Equation 1.

The computing device obtains the signal strength measurements of wireless signals received by the non-anchor AP from the anchor AP (1130). For example, the signal strength measurements may include RSSI measurements made by the non-anchor AP of the wireless signals transmitted by each antenna of the anchor AP and received by each antenna of the non-anchor AP. In some examples, the non-anchor AP may receive and measure the signal strengths of signals from multiple anchor APs. The signal strength measurements may be stored in, for example, a memory or database associated with the computing device, such as RSSI data information 370 of orientation engine 350 as shown in FIG. 3B. In other examples, some or all of the signal strength measurements may be obtained directly from the APs or from another computing device.

Although in the examples described herein the anchor APs are the transmitting APs and the non-anchor APs whose orientation is to be determined are the receiving AP, it shall be understood that the same techniques may also be applied to other examples in which the anchor AP is the receiving AP and the non-anchor AP is the transmitting AP, and the disclosure is not limited in this respect.

In accordance with one or more techniques of the disclosure, based on the signal strength measurements of the received wireless signals, the computing device determines a function, e.g., a probability function, based on the orientation angle ($\beta$) of the non-anchor AP for which the orientation is to be determined (1135). The probability function is a function of the unknown variables (e.g., $\beta$, PLF) and indicative of the probability that various RSSIs will assume the measured values given particular values of the orientation of the non-anchor AP (θ) and/or the PLF parameters. For example, the computing device may determine a logarithmic likelihood probability such as that shown in Equation 24. The determination of the logarithmic likelihood probability incorporates the knowledge of the locations of the APs including the x, y coordinates of each AP and the angle θ, the number of antennas in the anchor (or transmitting) AP, n, the number of antennas in the receiving (non-anchor neighbor) A, m, and the indices of the transmitting and receiving antennas (e.g., i, and j).

In some examples, only the logarithmic likelihood probability of the AP whose orientation is being determined is evaluated because the orientation of the first AP (e.g., a) has already been determined and as such does not need to be re-evaluated.

Figure 11B:
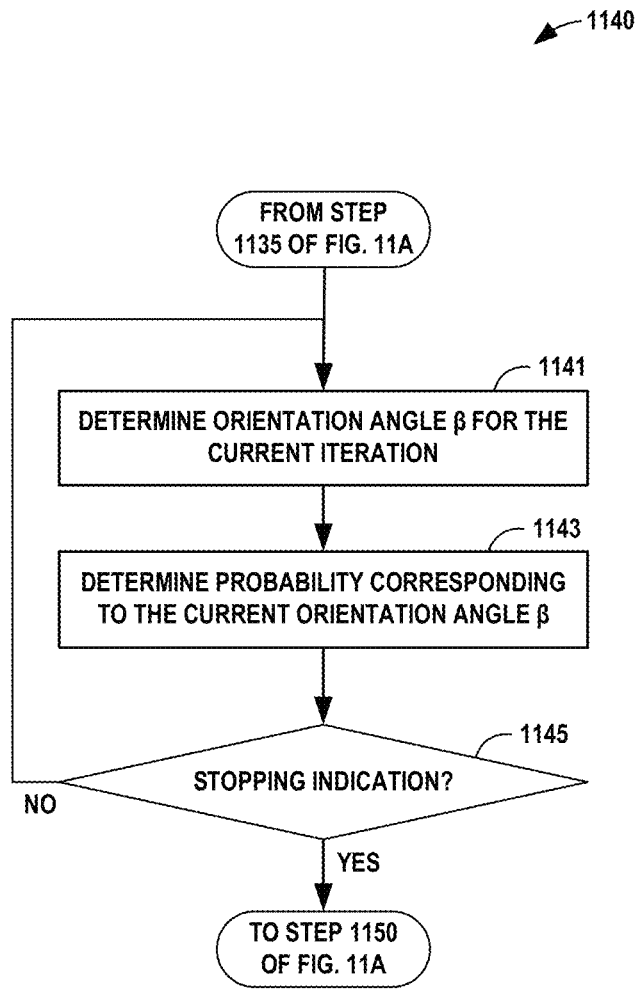

The computing device determines the orientation angle, $\beta$, of the non-anchor neighbor AP where the probability function is a maximum (1140). FIG. 11B is a flowchart illustrating an example process (1140) by which the computing device determines the orientation angle, $\beta$, of the non-anchor neighbor AP where the probability function is a maximum. In the first iteration, the computing device initializes the variables of one or more parameters, such as orientation angle, $\alpha$, of the anchor AP and the orientation angle, $\beta$, of the non-anchor AP whose orientation is to be determined (1141). In some examples, the orientation of the anchor AP is aligned with the reference coordinate system and therefore the orientation angle of the anchor AP, $\alpha$, is zero. In other examples, the orientation angle of the anchor AP is a known value with respect to the reference coordinate system. The value of the orientation angle of the non-anchor AP, $\beta$, is initialized at a predetermined value and modified and determined as described in greater detail below.

The computing device determines the probability corresponding to the current orientation angle $\beta$ (1143). For example, the computing device may determine the logarithmic likelihood probability as shown in Equation 24 for the orientation angle corresponding to the current iteration.

The computing device determines whether a stopping indication has been reached (1145). For example, to perform steps (1143) and (1145) the computing device may apply a gradient ascent algorithm to determine the next value of the orientation angle $\beta$ of the non-anchor AP (as well as the values of the other parameters of Equation 27) until the gradient ascent algorithm converges (in other words, the orientation angle, $\beta$, at which the probability is maximized). The calculation incorporates the knowledge of the angle θ, the number of AP antennas n and m, the indices of the transmitting and receiving antennas (e.g., j, and k), and the previously determined (or initialized) values of the orientations of the transmitting and receiving APs, such as $\alpha$ and $\beta_{(t-1)}$ of Equations 26 and 27.

In some examples, the operation determines that the algorithm has converged when the sign of the derivative described in Equation 26 changes polarity in each convergence step, indicating that the maximum has been reached. In other examples, the method determines that the algorithm has converged when the size of the adjustment is smaller than a predetermined value. In some examples, a hybrid method may be used that combines both convergence tests.

If the stopping/convergence indication has not been reached (e.g., the gradient ascent algorithm has not converged) (NO branch of 1145), the computing devices repeats steps (1141), (1143) and (1145) until convergence (or some predetermined number of iterations) is achieved. For example, on the next iteration of process (1140), the computing device determines the next value of the orientation angle $\beta$ (1141) and repeats steps (1143) and (1145) until the stopping indication is reached (e.g., the gradient ascent converges). In some examples, the computing device maintains a counter that keeps track of the number of times that the process repeats (not shown for sake of simplicity). If the system loops more than a predetermined number of times (e.g., 10,000 or some other predetermined number) without converging, the computing device determines that the gradient ascent cannot converge and that an error has occurred.

If the stopping/convergence indication has been reached (YES branch of 1145), the computing device returns to step (1150) of FIG. 11A, and stores the calculated orientation angle ($\beta$) for the current non-anchor AP (1150).

The computing device determines whether there are more APs with unknown orientations remaining to be determined (1155). If there are more APs with unknown orientations remaining to be determined (YES branch of 1155), the computing device returns to step (1110) and proceeds to determine the orientation for the next non-anchor neighbor AP.

If there are no APs with unknown orientations remaining to be determined (NO branch of 1155) the automatic orientation determination process is complete. Alternatively, the process (1100) may be repeated as indicated by the dashed line to periodically or continuously update the orientations of the APs in the wireless network. In this way, if the location and/or the orientation of any of the APs in the wireless network are changed, the AP orientation data is updated periodically to accurately reflect the current state of the wireless network. For example, if the orientation of one or more existing APs are changed (either intentionally or unintentionally) or if one or more APs are added or removed, the orientation data for all of the APs in the wireless network can be periodically updated. The orientations of the deployed APs may be automatically updated on a predetermined periodic basis, may be manually invoked by IT personnel, may be automatically triggered when an AP is removed from service or added to the network, etc. Because location information for wireless client devices associated with a wireless network is determined based in part on the orientation of the deployed APs, periodically updating orientations of the deployed APs helps to ensure that location information for wireless client devices associated with the wireless network is as accurate as possible.

In some examples, the computing device may further automatically suggest and/or invoke one or more actions based on the automatically determined orientation of one or more APs (1160). As one example, the computing device may generate data representative of a user interface (UI) for display, such as user interface elements representing one or more of a plurality of AP devices at a site and the corresponding coordinate locations and/or orientation angles of one or more of the plurality of APs at the site. For example, the UI may include a map of the site and one or more user interface elements indicative of each AP and its location and orientation angle relative to the site.

In some examples, the user interface elements representing the APs may be color coded to indicate the status of the orientation (and/or location) determination for each AP. For example, an AP may be color coded with a first color (e.g., yellow) to indicate that the orientation (and/or location) for that AP has not been performed. The at least three anchor APs maybe color coded a second color (e.g., blue) to visually identify the anchor APs from among the other APs at the site and to provide a visual indication of the absolute locations and orientations of the anchor APs at the site. Once the automatic orientation of an AP has been determined, the AP may be color coded a third color (e.g., green) to visually indicate the successful automatic orientation determination of that AP. In some examples, the automatically determined orientation may be compared with a stored orientation. If the stored orientation (e.g., an orientation manually input by a user or a previous automatically determined orientation) does not match the current automatically determined orientation, the system may automatically update the stored orientation to the current automatically determined orientation. In some examples, based on the automatically determined orientation of one or more APs, the computing device may generate a notification to indicate that manual remedial or corrective action should be taken to manually adjust the orientation of one or more APs. In examples where the computing device is able to automatically address or correct an erroneous or no longer current orientation, the AP may be color coded the third color (e.g., green) to visually indicate successful orientation determination of the AP.

As another example, the computing device may analyze the locations and/or orientations of one or more of the plurality of APs at the site and generate a notification indicative of whether the deployment of APs at the site (in other words, the locations and/or orientations at the site where the APs were installed) is acceptable for purposes of wireless network performance. For example, the computing device may analyze the locations and/or orientations of one or more of the plurality of APs at the site and generate a notification informing a network administrator that the deployment is acceptable/successful, that one or more of the APs should be moved to a different location, that the orientation of one or more APs should be manually adjusted, and/or that one or more APs should be added at a particular location(s), etc., in order to optimize the wireless network at the site.

As another example, the computing device may analyze the locations and/or orientations of one or more of the plurality of APs at the site to automatically adjust the transmit power and/or channel selection of one or more of the plurality of APs with respect to each other in order to optimize the wireless network at the site.

As another example, the computing device may analyze the locations and/or orientations of one or more of the plurality of APs at the site to determine a root cause(s) of poor network performance or an error condition, and/or to determine whether to automatically invoke a remedial action intended to address the root cause(s). If the computing device determines that a remedial action to the root cause cannot be automatically invoked, the computing device may generate a notification indicative of one or more suggested remedial actions that may be taken by a network administrator to address the root cause(s).

As another example, the computing device may utilize the locations and/or orientations of one or more of the plurality of APs at the site to provide location services to one or more wireless client devices (e.g., smart phones, tablet computers, IoT devices, etc.) associated with the wireless network. The location services may include, for example, any one or more of wayfinding, location-based proximity notifications, asset tracking, etc. The computing device may also provide location-based analytics to a network administrator or other user that derive insights from client mobility through the premises.

As other examples, the computing device may further monitor and/or utilize the locations and/or orientations of one or more of the plurality of APs at the site for the purposes of wireless network installation, optimization, troubleshooting, diagnostics, location services, and any other network monitoring and management functions.

In some examples, when storing the automatically determined orientation angle ($\beta$) for the current non-anchor AP (1150), rather than storing the actual value of the automatically determined orientation angle $\beta$ for the current non-anchor AP at which the probability is a maximum (1150), the computing device may further automatically assign the orientation angle $\beta$ for the current non-anchor AP to one of a plurality of predefined orientation angles. For example, in some implementations, it may be sufficient to know the orientation angle of each non-anchor AP to within a predetermined tolerance, such as 45 degrees. In some examples, the predetermined tolerance may be 90 degrees; however, it shall be understood that any appropriate predetermined tolerance may be selected and that the disclosure is not limited in this respect. When the predetermined tolerance is 45 degrees, for example, the one or more predefined orientation angles may include 0, 45, 90, 135, 180, 225, 270, and 315 degrees (or other predefined orientation angles that are 45 degrees apart). When the predetermined tolerance is 90 degrees, for example, the one or more predefined orientation angles may include 0, 90, 180, and 270 degrees (or other predefined orientation angles that are 90 degrees apart). In such examples, the computing device may determine which of the predefined values is closest to the actual value of the determined orientation angle $\beta$ for the current non-anchor AP, and store the closest one of the plurality of predefined orientation angles as the orientation angle $\beta$ for the current non-anchor AP in step (1150). For example, if the predefined orientation angles include 0, 45, 90, 135, 180, 225, 270, and 315 degrees, and the automatically determined value of the orientation angle $\beta$ for the current non-anchor AP determined at step (1140) is 38 degrees, the computing device may store the orientation angle $\beta$ for the current non-anchor AP as the predefined orientation angle 45 degrees instead of the actual value of 38 degrees. As another example, if the predefined orientation angles include 0, 90, 180, and 270 degrees, and the automatically determined orientation angle $\beta$ for the current non-anchor AP determined at step (1140) is 38 degrees, the computing device may store the orientation angle $\beta$ for the current non-anchor AP as the predefined orientation angle 0 degrees instead of the actual value of 38 degrees. In some examples, the computing device may store both the actual value of the automatically determined orientation angle and the value of the assigned predefined orientation angle.

Figure 11C:
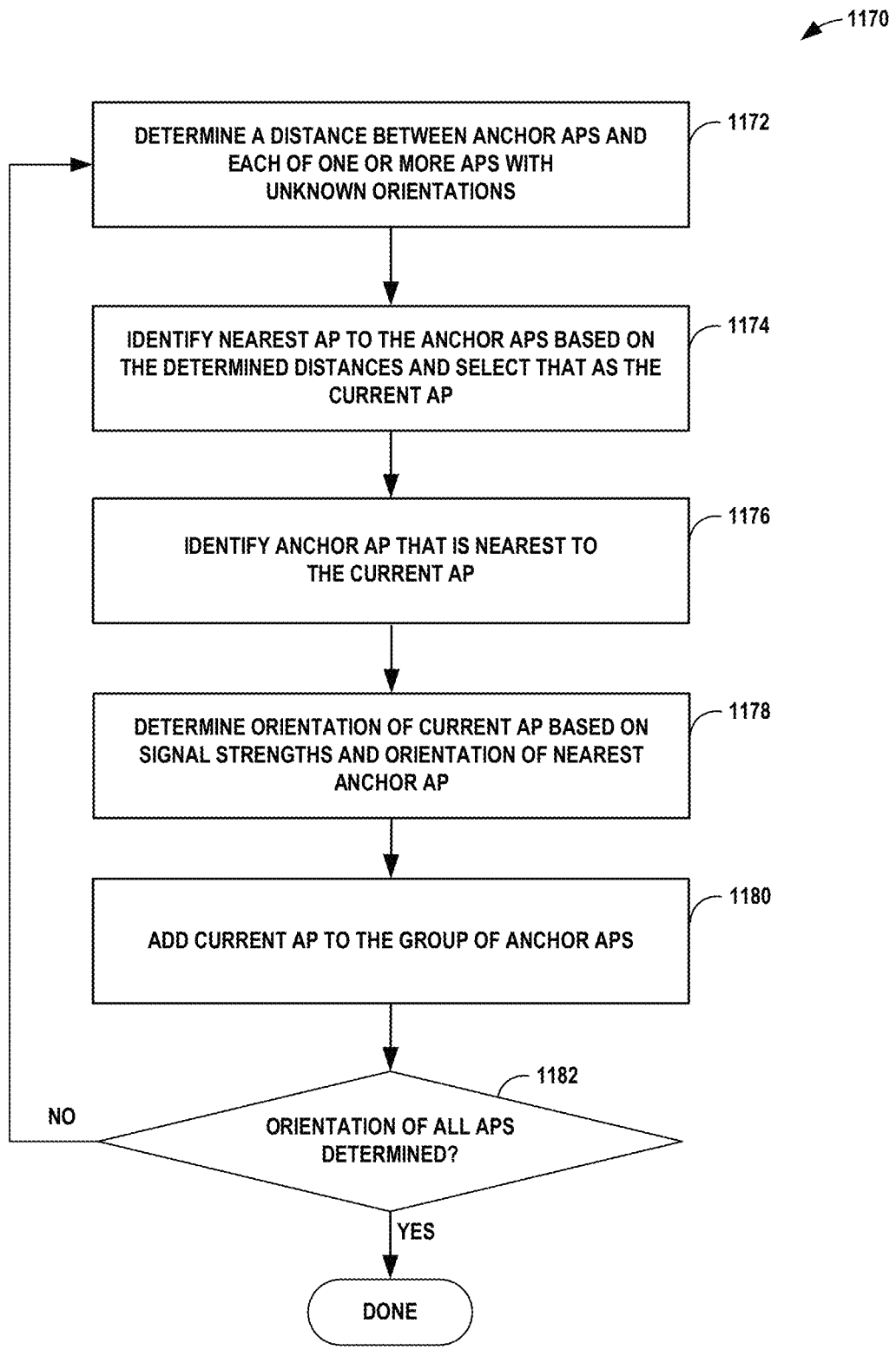

FIG. 11C is a flowchart of an example process (1170) by which a computing device selects at least one anchor AP having a known orientation and a neighbor AP whose orientation is to be determined, in accordance with one or more techniques of the disclosure. In some examples, process (1170) may be used to implement step (1110) of FIG. 11A.

In some examples, the computing device includes one or more processor(s) of a network management system and/or an AP orientation engine, such as processor(s) 306 of NMS 130/300 as shown in FIGS. 1A-1B and/or FIGS. 3A-3B, and/or processors 396 of AP orientation engine 350 as shown in FIGS. 3A-3B. In such examples, the deployed APs may include APs 142/200 as shown in FIGS. 1A and/or FIG. 2, or any other devices in a wireless network, such as wireless networks 106 as shown in FIGS. 1A-1B.

In accordance with one or more techniques of the disclosure, in some examples, the computing device determines the orientation angles of APs in a wireless network one at a time in an order determined by which AP is "nearest" to a group of one or more anchor APs. For each AP having an unknown orientation, the computing device determines a "distance" between the AP and a group of one or more anchor APs (1172). For example, to determine the "distance" between an AP and the group of one or more anchor APs, the computing device may determine an average of the distances between the AP and each of the anchor APs. The computing device determines which AP is nearest to the group of anchor APs based on the determined average distance for each AP (1174). The AP having the smallest average "distance" to the group of anchor APs is identified as the "nearest" AP and this is the current AP for which the orientation is to be determined during the current iteration of the process.

Once the nearest (current) AP having an unknown orientation is identified (1174), the computing device identifies the anchor AP that is nearest to the current AP (1176). For example, the anchor AP having the smallest distance to the current AP is identified as the "nearest" anchor AP. In some examples, the computing device identifies multiple anchor APs that are near the identified current AP.

The computing device determines the orientation of the current AP based on the signal strengths of the received signals from the nearest anchor AP and the orientation of the nearest anchor AP (1178). For example, the computing device may execute example process (1100) as shown in FIG. 11A to determine the orientation, $\beta$, of the current AP based on the signal strengths of the received signals from the nearest anchor AP and the known orientation, $\alpha$, of the nearest anchor AP.

Once the orientation of the current AP is determined, the computing device adds the current AP to the group of anchor APs (1180). In other words, the current AP is added to the list of anchor APs and becomes one of the anchor APs for the next iteration of the process (1170).

The computing device determines whether the orientations of all of the APs have been determined (1182). That is, the computing device determines whether there are any remaining APs with unknown orientations. If the orientations of all APs have not been determined (NO branch of 1182), the process (1170) repeats by identifying the next nearest AP to the group of (merged) anchor APs (1172). If the orientations of all non-anchor APs have been determined (YES branch of 1182), the process is complete. As with the process (1100) of FIG. 11A, the process may be repeated periodically or on demand such that the orientations of all APs in the wireless network accurately reflect the current state of the wireless network.

Figure 12:
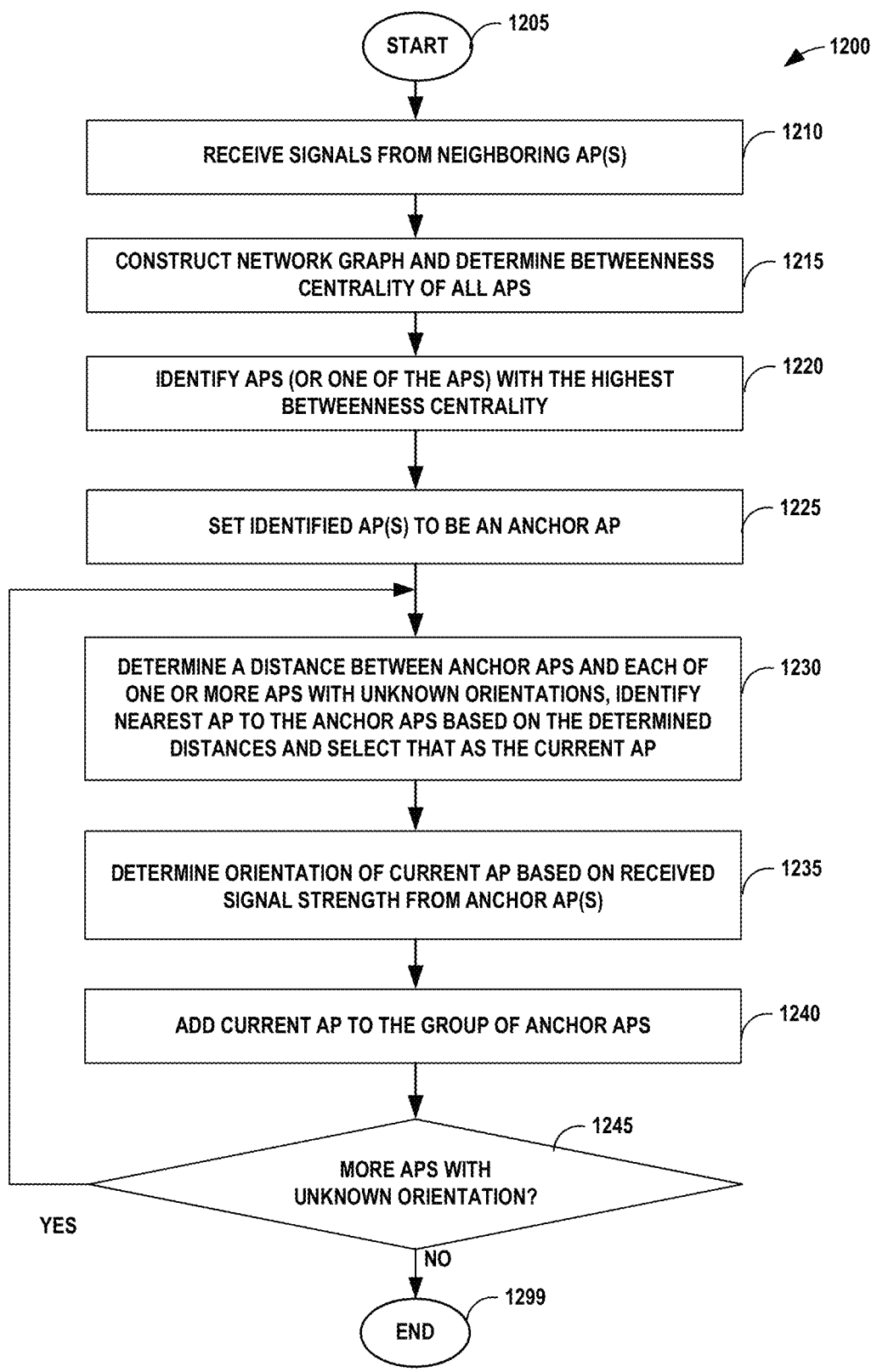
FIG. 12 is a flowchart illustrating another example process by which a computing device may determine orientations of one or more deployed APs, in accordance with one or more techniques of the disclosure.

FIG. 12 is a flowchart of another example process (1200) by which a computing device selects at least one anchor AP having a known orientation and a neighbor AP whose orientation is to be determined (1200), in accordance with one or more techniques of the disclosure. In some examples, process (1200) may be used to implement step (1110) of FIG. 11A.

In some examples, the computing device includes one or more processor(s) of a network management system and/or an AP orientation engine, such as processor(s) 306 of NMS 130/300 as shown in FIG. 1 and/or FIGS. 3A-3B, and/or processors 396 of AP orientation engine 350 as shown in FIGS. 3A-3B. In such examples, the deployed APs may include APs 142/200 as shown in FIGS. 1 and/or FIG. 2, or any other devices in a wireless network, such as wireless networks 106 as shown in FIG. 1.

In accordance with one or more techniques of the disclosure, in some examples, the computing device determines the orientation angles of APs in a wireless network one at a time in an order determined by which AP has a higher betweenness centrality. The method recognizes the fact that while the orientation of the first anchor AP is determined with a high level of accuracy, each time the method calculates an orientation of an AP which is 'further" from the first anchor, a small error may be introduced to the orientation of the AP for which the orientation has been determined. To minimize this error, the method utilizes the betweenness measure of the various nodes in the process of determining the orientations of all the APs in the network. The process starts in operation 1205 and proceeds to operation 1210 where APs receive signals from their neighboring APs and determine their neighbors. Two APs are considered to be neighbors if one AP receives a signal from a second AP at a power greater than a predetermined threshold. Said differently, two APs are considered to be neighbors if each AP receives a signal with RSSI f greater than a predetermined value from the other AP. The RSSI, measured by the various APs, are sent to the NMS where a graph of the network is constructed based on the RSSI values. The graph data can be stored in memory such as memory 317 of FIG. 3. The method applies the betweenness algorithm and determines the betweenness centrality of each AP (1215).

In accordance with one example implementation, the AP with the highest betweenness centrality is identified (1220); this AP is set to be the anchor AP for which a precise orientation measurement is performed, or alternatively, the global coordinates are set to align with the coordinates of this AP (1225).

Next the system selects the current AP for which the orientation is to be determined. The computing device determines a distance between the anchor AP(s) and each of one or more APs with unknown orientations, identifies the nearest AP to the anchor AP(s) based on the determined distances, and selects the nearest AP as the current AP (1230). This is the same process described with respect to reference numerals 1172 and 1174 of FIG. 11C. The orientation of the current AP is determined as described with respect to FIG. 11A based on the strength of signal(s) received from neighboring AP(s) (1235). Once the orientation of the current AP is determined, the AP is added to the group of anchor AP(s) (1240).

The method checks to see if there is any other AP for which the orientation is unknown (1245). If the process determines that there is another AP with an unknown orientation (YES branch of 1245), the process loops back to operation 1230 and the process of determining the orientation of this AP is repeated. Otherwise, if the process determines that the orientation for all of the APs is known (NO branch of 1245), the process ends in operation 1299. As with the process (1100) of FIG. 11A, the process may be repeated periodically or on demand such that the orientations of all APs in the wireless network accurately reflect the current state of the wireless network.

FIGS. 13A-13D illustrate example user interfaces including user interface elements representing one or more aspects of the orientation of one or more deployed APs, in accordance with one or more techniques of the disclosure. In some examples, automatic determination of AP orientation performed by, for example, NMS 150/300 executing AP orientation engine 350 as shown in FIGS. 3A-3B, as described herein may be offered as an optional service to customers associated with a site where one or more APs are deployed to establish a wireless network. In such examples, NMS 150/300 may generate one or more user interfaces by which a user (e.g., service technician, etc.) may view and/or control automatic determination of AP orientation at one or more sites.

Figure 13A:
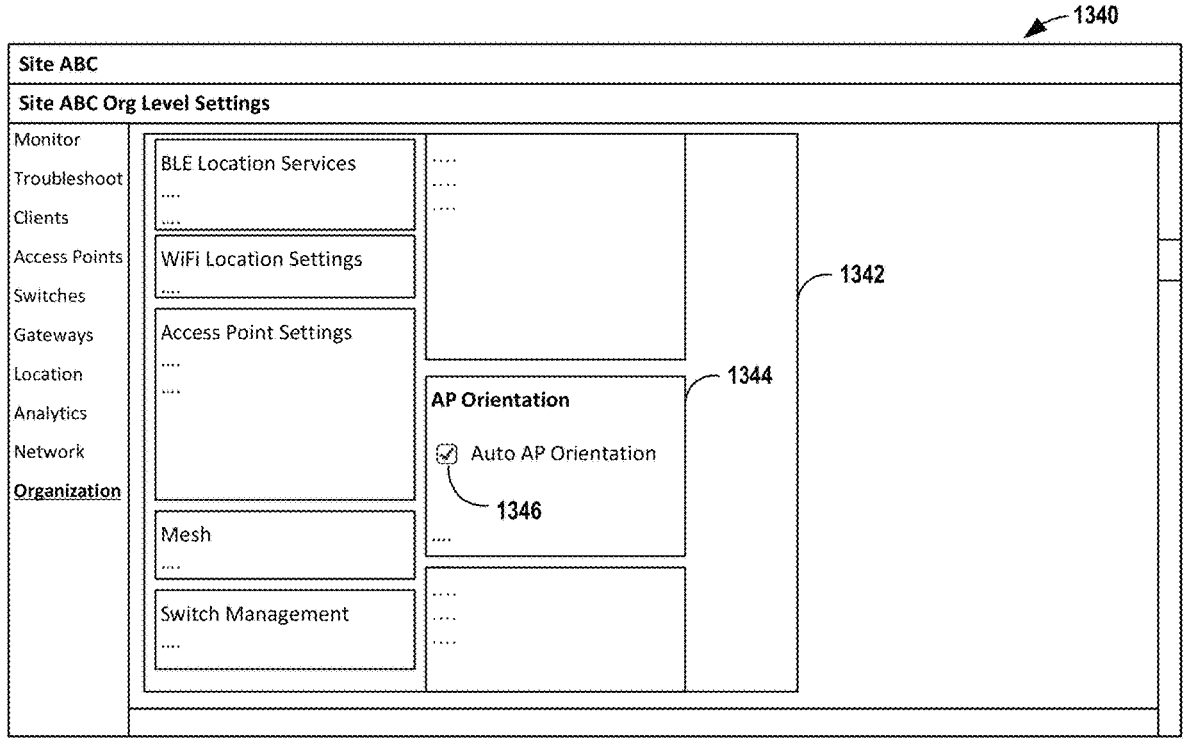
FIGS. 13A-13D illustrate example user interfaces including user interface elements representing one or more aspects of the orientation of one or more deployed APs, in accordance with one or more techniques of the disclosure.

FIG. 13A illustrates an example user interface 1340 that is currently displaying a view of an organization level settings dashboard 1342 for a wireless network at a site designated, "Site ABC." Dashboard 1342 includes a sub window 1344 including one or more user interface elements, such as user interface element 1346, related to settings for "AP Orientation." In this example, user interface element 1346 is a check box by which a user may enable or disable "Auto AP Orientation" for Site ABC by selecting or deselecting check box 1346, respectively. In some examples, automatic determination of AP orientation is either disabled or enabled by default, and the user must either select or deselect check box 1346 if automatic AP orientation is desired/not desired. When the "Auto AP Orientation" user interface element 1346 is selected, NMS 150/300 executing AP orientation engine 350 as shown in FIGS. 3A-3B, automatically determines the orientation of one or more deployed AP at the site. NMS will store the automatically determined orientation angle of each AP. As described above, in some examples, NMS stores the actual value of the automatically determined AP orientation angle and/or (as explained in greater details with reference to FIGS. 13B-C) determines and stores a closest one of a plurality of predefined AP orientation angles.

Figure 13D:
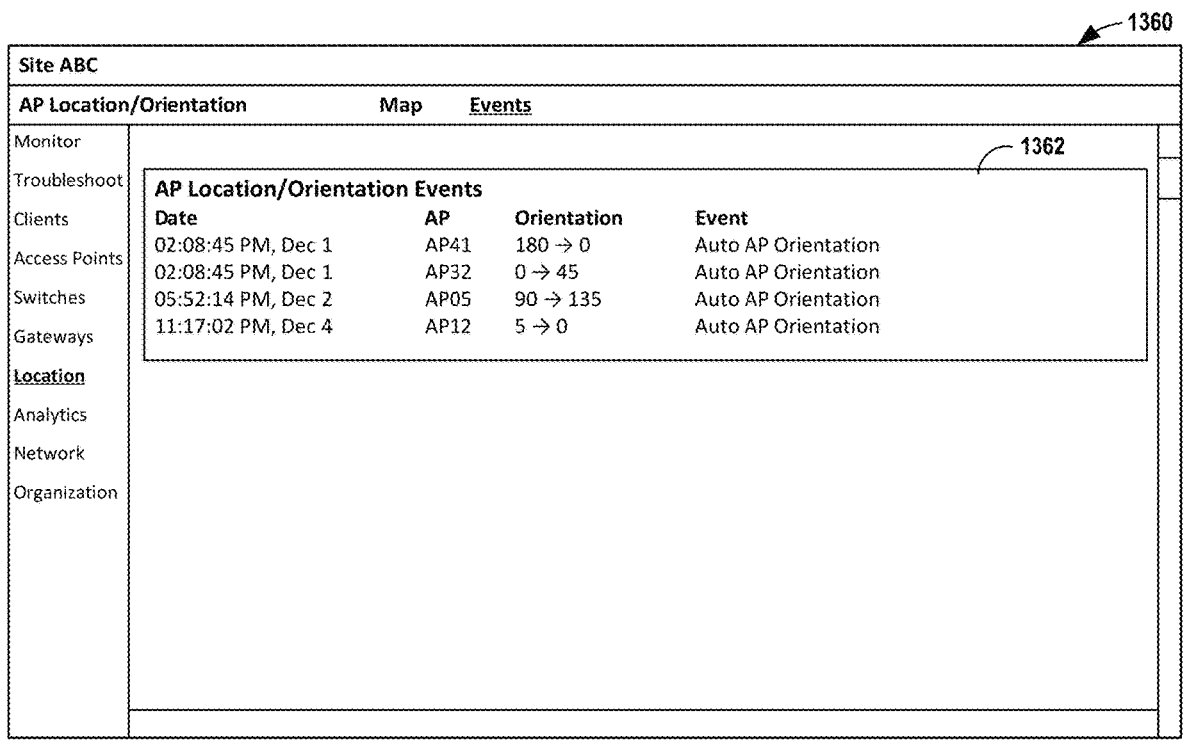
Figure 13B:
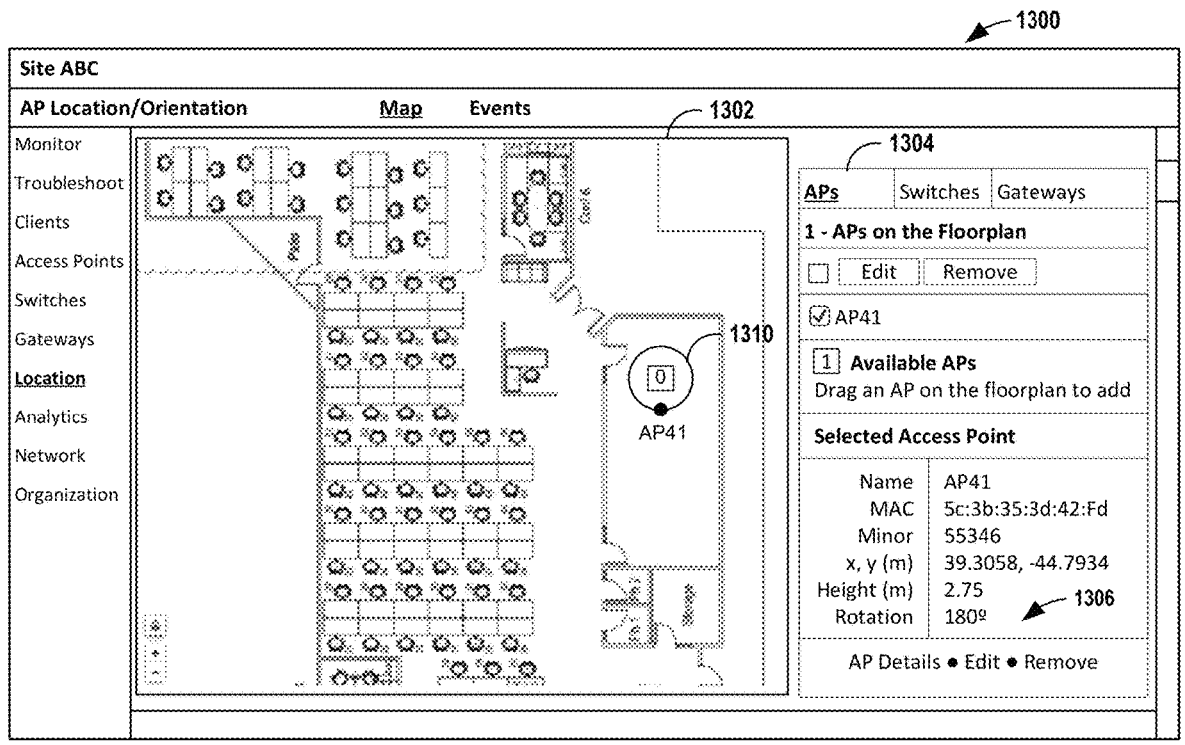
Figure 13C:
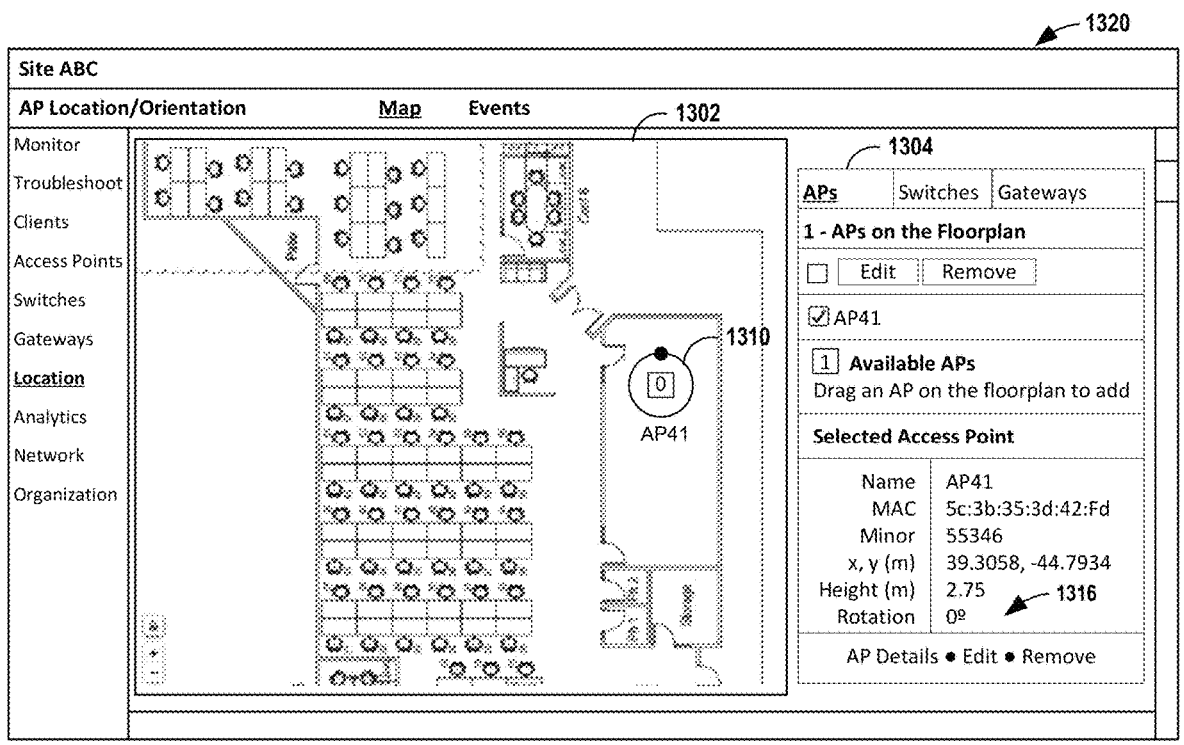

FIGS. 13B and 13C illustrate an example user interface 1300 before (FIG. 13B) and an example user interface 1320 after (FIG. 13C) automatic determination of AP orientation for a single AP at site, in accordance with one or more techniques of the disclosure. User interface 1300 is currently displaying a map of the site, "Site ABC" in a first window 1302 and AP information in a second window 1304 corresponding to the APs at Site ABC. In this example, for simplicity of illustration, a single AP, AP41, is shown on the map 1302, and details of the single AP are shown in window 1304. However, in general a map of a site would include one or more APs deployed at the site displayed on the map in their respective locations. In addition, window 1304 may include a list of all APs deployed at the site. Details of the selected AP(s) are shown in window 1304. In the examples of FIGS. 13A and 13B, the name, MAC address, x, y coordinate location, height and angle of orientation (here indicated as "Rotation") of the selected AP(s) are shown. Each AP may be represented on map 1302 by a user interface element, such as a rotatable virtual knob 1310 that represents the location and orientation of AP41 in this example. A small dot on the circumference of virtual knob 1310 indicates the angle of orientation of the respective AP. In some examples, before AP automatic orientation is performed, the angle of orientation is equivalent to a stored value such as the value entered by a user at, for example, the time of installation or at some other time. Virtual knob 1310 is user adjustable such that the user may select and rotate virtual knob 1310 to adjust or set the orientation angle of AP 1310 that is stored within the system. Alternatively, the user may manually enter the orientation angle in some other manner (e.g., text box, pull down menu, etc.), and the angle of orientation as indicated by virtual knob 1310 and the angle of orientation 1306/1316 indicated in window 1304 will change to reflect the value entered by the user and stored in the system.

In accordance with one or more techniques of the disclosure, assume an example in which a service technician associated with Site ABC mistakenly sets the orientation angle of AP41 at 1800 as shown in FIG. 13B. Assume further that upon execution of an automatic determination of AP orientation service as described herein, NMS 150/300 executing AP orientation engine 350 determines that the correct orientation angle of AP41 is 0°. If automatic AP orientation is enabled (see, e.g., FIG. 13A and ref num. 1346), NMS 150/300 automatically updates the stored value of the orientation angle of AP41 from the incorrect orientation angle of 1800 to the correct orientation angle of 0°. NMS 150/300 further updates both virtual knob 1310 and the angle of orientation 1306/1316 indicated in window 1304 from that shown in FIG. 13B to that shown in FIG. 13C to reflect this automatic update of the angle of orientation of AP41.

In some examples, as discussed elsewhere herein, when storing the automatically determined orientation angle for the one or more AP(s) at a site, rather than storing the actual value of the automatically determined orientation angles for the APs, NMS 150/300 may further automatically assign the orientation angle for each of the one or more APs to one of a plurality of predefined orientation angles. For example, in some implementations, it may be sufficient for purposes of determining the location of one or more client devices in a wireless network to know the orientation angle of each AP in the wireless network to within a predefined tolerance, such as 45 degrees. In some examples, the predetermined tolerance may be 90 degrees; however, it shall be understood that any appropriate predetermined tolerance may be selected and that the disclosure is not limited in this respect. When the predetermined tolerance is 45 degrees, for example, the one or more predefined orientation angles may include 0, 45, 90, 135, 180, 225, 270, and 315 degrees (or other predefined orientation angles that are 45 degrees apart). When the predetermined tolerance is 90 degrees, for example, the one or more predefined orientation angles may include 0, 90, 180, and 270 degrees (or other predefined orientation angles that are 90 degrees apart). In such examples, NMS 150/300 may determine which of the predefined values is closest to the actual value of the automatically determined orientation angle for each AP, and store the closest one of the plurality of predefined orientation angles as the orientation angle for the AP. As one example, NMS 140/300 may round the automatically determined orientation angle up or down to the nearest one of the predefined orientation angles. As one example, if the predefined orientation angles include 0, 45, 90, 135, 180, 225, 270, and 315 degrees, and the automatically determined value of the orientation angle for an AP is 38 degrees, NMS may store the orientation angle for the AP as the closest predefined orientation angle of 45 degrees instead of the automatically determined value of 38 degrees. As another example, if the predefined orientation angles include 0, 90, 180, and 270 degrees, and the automatically determined orientation angle for an AP is 38 degrees, NMS 150/300 may store the orientation angle for the as the predefined orientation angle 0 degrees instead of the actual value of 38 degrees. In some examples, NMS 150/300 may store both the actual value of the automatically determined orientation angle and the value of the assigned predefined orientation angle.

FIG. 13D illustrates an example user interface 1360 including an event log 1362 indicative of automatic AP orientation events for one or more APs at a site, in accordance with one or more techniques of the disclosure. Event log 1362 lists the Date/Time of the event, the AP associated with the event, the change in the APs orientation (before and after) and the type of event. The first line of event log 1362 illustrate the example event described above with respect to FIGS. 13B and 13C in which the orientation of AP41 was automatically updated from the incorrect orientation angle of 180° to the correct orientation angle of 0°. In that example event, event log 1362 shows that the Date/Time of the event was 02:08:45 PM on December 1, the AP associated with the event was AP41, the AP orientation was updated from 180 degrees to 0 degrees, and the type of event was an automatic AP orientation update event. Event log 1362 also lists similar automatic AP orientation update events for AP32 (orientation updated from 0 degrees to 45 degrees) and AP05 (orientation updated from 90 degrees to 135 degrees).

On or more of the automatic orientation events listed in event log 1362 may occur at substantially the same time, such as when the automatic AP orientation service is executed on one or more of the APs deployed at a site, such after an initial installation of the APs at the site. In other examples, the orientation of one or more APs may be updated periodically in the event one or more of the APs are moved (either intentionally or accidentally).

The techniques of the disclosure may provide one or more technical advantages, technical improvements, and practical applications. As an example, the techniques described herein enable automated determination of the orientation of a plurality of deployed APs to provide highly accurate determination of AP orientations quickly and efficiently. For example, the disclosed examples recognize that in order to provide more accurate orientation determinations, the orientation of an AP should be determined without going through intermediary steps, such as estimating distances between a reference AP and an AP whose orientation is being estimated, which may introduce additional error into the calculation of the AP orientations. Instead, the techniques of the disclosure automatically determine the orientation of each AP directly from the measured signal strengths (e.g., RSSI) of wireless signals. The received signal strength indicator (RSSI) can be measured for wireless signals which, for example, may include 2.4 Ghz and/or 5 GHz band(s), thus avoiding the inaccuracies introduced by the geometric dilution of precision.

In addition, the ability to automatically determine the orientation of APs may greatly reduce the cost to deploy a wireless network because it is not necessary to dispatch technicians to conduct an on-site survey. It may also increase the accuracy of the determined AP orientations as compared to the error-prone and time consuming process of manually measuring and logging of hundreds or even thousands of AP orientations. The techniques therefore support the provision of highly accurate location-based services at a site, which depend upon the location and orientation of each of AP being known to a high degree of accuracy. Yet another benefit is that it facilitates automated and remote verification of AP deployment orientations without necessitating dispatching technicians to conduct an on-site survey. In addition, the determined AP orientations provided by the techniques described herein may further be used for RF coverage optimization and radio resource management of the APs at the site, such as channel and transmit power level selection.

Examples, as described herein, include, or operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software resides on a machine readable medium. In an example, the software, when executed by the underlying hardware of the module, causes the hardware to perform the specified operations.

The techniques of various examples are implemented using software, hardware and/or a combination of software and hardware. Various examples are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various examples are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes are rearranged while remaining within the scope of the present disclosure. The accompanying method claims present elements of the various steps in an example order, and are not meant to be limited to the specific order or hierarchy presented.

In various examples devices and nodes described herein are implemented using one or more modules to perform the steps corresponding to one or more methods, for example, signal generation, transmitting, processing, analyzing, and/or receiving steps. Thus, in some examples various features are implemented using modules. Such modules are implemented, in at least some examples, using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple or all of the operations of the disclosed examples.

In some examples, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor is achieved, in at least some examples, by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules are implemented, in at least some examples, purely in hardware, e.g., as circuits, or implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. Depending on the example, the computer program product can, and sometimes does, include different code for each step to be performed. Thus, the computer program product includes, in at least some examples, code for each individual step of a method, e.g., a method of operating a communications device, e.g., a network management node, an access point, a base station, a wireless terminal or node. The code is in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, configured to implement some or all of the steps of the methods described herein. The processor is for use in, e.g., a communications device or other device described in the present application.

While described in the context of a communications system including wired, optical, cellular, Wi-Fi, Bluetooth and BLE, at least some of the methods and apparatus of various examples are applicable to a wide range of communications systems including IP and non IP based, OFDM and non-OFDM and/or non-cellular systems.

Numerous additional variations on the methods and apparatus of the various examples described above will be apparent to those skilled in the art in view of the above description. Such variations are to be considered within the scope. The methods and apparatus are used, in at least some examples, with IP based and non-IP, wired and wireless such CDMA, orthogonal frequency division multiplexing (OFDM), Wi-Fi, Bluetooth, BLE, optical and/or various other types of communications techniques which are used, in at least some examples, to provide communications links between network attached or associated devices or other devices including receiver/transmitter circuits and logic and/or routines, for implementing the methods.

What is claimed is:

1. A system comprising:
   a plurality of access point devices (APs) configured to provide a wireless network at a site, each of the plurality of APs having a known location; and
   a network management system comprising:
      one or more processors; and
      a memory comprising instructions that, when executed by the one or more processors, cause the one or more processors to:
         for each of the plurality of APs having an unknown orientation angle, determine a distance between a corresponding AP of the plurality of APs and a plurality of anchor APs;
         identify one of the plurality of APs having an unknown orientation angle as a nearest AP to the plurality of anchor APs based on the determined distances;
         assign the nearest AP as a second AP and one of the plurality of anchor APs as a first AP;
         determine, based on a known location of the first AP, a known location of the second AP, and received signal strength measurements of wireless signals transmitted between one or more antennas of the first AP and one or more antennas of the second AP, an orientation angle of the second AP; and
         generate an output indicative of the orientation angle of the second AP.

2. The system of claim 1, wherein the memory further comprises instructions that, when executed by the one or more processors, cause the one or more processors to:
   determine an angle between the first AP and the second AP based on the known location of the first AP and the known location of the second AP.

3. The system of claim 1, wherein to determine the orientation angle of the second AP, the memory further comprises instructions that, when executed by the one or more processors, cause the one or more processors to:
   determine the orientation angle of the second AP based on the known location of the first AP, the known location of the second AP, a known orientation angle of the first AP, and the received signal strength measurements of wireless signals originating at one or more antennas of the first AP and received by one or more antennas of the second AP.

4. The system of claim 1, wherein to determine the orientation angle of the second AP, the memory further comprises instructions that, when executed by the one or more processors, cause the one or more processors to:
   determine a logarithmic likelihood probability that a wireless signal of a specific signal strength has been received by one or more antennas of the second AP.

5. The system of claim 4, wherein the logarithmic likelihood probability is a function of a known orientation angle of the first AP, an unknown orientation angle of the second AP, the known location of the first AP, and the known location of the second AP.

6. The system of claim 4, wherein the logarithmic likelihood probability is a function of a spherical harmonics function of a known orientation angle of the first AP and an unknown orientation angle of the second AP.

7. The system of claim 4, wherein to determine the orientation angle of the second AP, the memory further comprises instructions that, when executed by the one or more processors, cause the one or more processors to:
  determine the orientation angle of the second AP at which the logarithmic likelihood probability is a maximum.

8. The system of claim 1, the memory further comprising instructions that, when executed by the one or more processors, cause the one or more processors to:
  provide location services to one or more wireless client devices associated with the wireless network based on determined orientation angles of one or more of the plurality of APs.

9. The system of claim 1, the memory further comprising instructions that, when executed by the one or more processors, cause the one or more processors to:
  determine a betweenness centrality for each of the plurality of APs based on a network graph, wherein the network graph is based on received signal strength measurements of wireless signals transmitted between the plurality of APs,
  wherein the first AP is one of the plurality of APs having a highest betweenness centrality among the plurality of APs.

10. The system of claim 1, the memory further comprising instructions that, when executed by the one or more processors, cause the one or more processors to:
  assign one of the plurality of anchor APs that is nearest to the nearest AP as the first AP.

11. A method comprising:
  for each of a plurality of access point devices (APs) configured to provide a wireless network at a site and having an unknown orientation angle, determining a distance between a corresponding AP of the plurality of APs and a plurality of anchor APs;
  identifying one of the plurality of APs having an unknown orientation angle as a nearest AP to the plurality of anchor APs based on the determined distances;
  assigning the nearest AP as a second AP and one of the plurality of anchor APs as a first AP;
  determining, based on a known location of the first AP, a known location of the second AP, and received signal strength measurements of wireless signals transmitted between one or more antennas of the first AP and one or more antennas of the second AP, an orientation angle of the second AP; and
  generating an output indicative of the orientation angle of the second AP.

12. The method of claim 11, further comprising:
  determining an angle between the first AP and the second AP based on the known location of the first AP and the known location of the second AP.

13. The method of claim 11, wherein determining the orientation angle of the second AP comprises:
  determining the orientation angle of the second AP based on the known location of the first AP, the known location of the second AP, a known orientation angle of the first AP, and the received signal strength measurements of wireless signals originating at one or more antennas of the first AP and received by one or more antennas of the second AP.

14. The method of claim 11, further comprising:
  determining a logarithmic likelihood probability that a wireless signal of a specific signal strength has been received by one or more antennas of the second AP.

15. The method of claim 14, wherein the logarithmic likelihood probability is a function of a known orientation angle of the first AP, an unknown orientation angle of the second AP, the known location of the first AP, and the known location of the second AP.

16. The method of claim 14, wherein the logarithmic likelihood probability is a function of a spherical harmonics function of a known orientation angle of the first AP and an unknown orientation angle of the second AP.

17. The method of claim 14, wherein determining the orientation angle of the second AP comprises:
  determining the orientation angle of the second AP at which the logarithmic likelihood probability is a maximum.

18. The method of claim 11, further comprising:
  providing location services to one or more wireless client devices associated with the wireless network based on determined orientation angles of one or more of the plurality of APs.

19. The method of claim 11, further comprising:
  determining a betweenness centrality for each of the plurality of APs based on a network graph based on received signal strength measurements of wireless signals transmitted between the plurality of APs,
  wherein the first AP is one of the plurality of APs having a highest betweenness centrality among the plurality of APs.

20. The method of claim 11, wherein generating an output indicative of the orientation angle of the second AP comprises generating, for display on a user computing device, a virtual knob including an indication of the orientation angle of the second AP.

21. The method of claim 11, further comprising:
  receiving an indication enabling automatic determination of AP orientation angles;
  for each of the plurality of APs, automatically determining an orientation angle of the corresponding AP; and
  automatically updating a stored orientation angle of the corresponding AP to include the automatically determined orientation angle of the corresponding AP.

22. The method of claim 11, further comprising:
  receiving an indication enabling automatic determination of AP orientation angles;
  for each of the plurality of APs, automatically determining an orientation angle of the corresponding AP; and
  automatically generating, for display on a user computing device, a virtual knob including an indication of the automatically determined orientation angle of the second AP.

23. The method of claim 11, wherein generating an output indicative of the orientation angle of the second AP further comprises generating, for display on a user computing device and for each of a plurality of automatic AP orientation events, an AP identification, a previous AP orientation angle, and an updated AP orientation angle.

24. Non-transitory computer readable media comprising instructions that, when executed by one or more processors, cause the one or more processors to:
  for each of a plurality of access point devices (APs) configured to provide a wireless network at a site and having an unknown orientation angle, determine a distance between a corresponding AP of the plurality of APs and a plurality of anchor APs;
  identify one of the plurality of APs having an unknown orientation angle as a nearest AP to the plurality of anchor APs based on the determined distances;
  assign the nearest AP as a second AP and one of the plurality of anchor APs as a first AP;

determine, based on a known location of the first AP, a known location of the second AP, and received signal strength measurements of wireless signals transmitted between one or more antennas of the first AP and one or more antennas of the second AP, an orientation angle of the second AP; and generate an output indicative of the orientation angle of the second AP.

\* \* \* \* \*